(12) United States Patent (10) Patent No.: US 9,323,126 B2
Nakazawa et al. (45) Date of Patent: Apr. 26, 2016

(54) ELECTROPHORETIC PARTICLES, METHOD FOR MANUFACTURING ELECTROPHORETIC PARTICLES, ELECTROPHORESIS DISPERSION, DISPLAY DEVICE, AND ELECTRONIC APPARATUS

(71) Applicant: SEIKO EPSON CORPORATION, Tokyo (JP)

(72) Inventors: Masahiko Nakazawa, Matsumoto (JP); Shinobu Yokokawa, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 177 days.

(21) Appl. No.: 14/287,828

(22) Filed: May 27, 2014

(65) Prior Publication Data

US 2014/0355104 A1 Dec. 4, 2014

(30) Foreign Application Priority Data

Jun. 4, 2013 (JP) .................. 2013-118129
Feb. 18, 2014 (JP) .................. 2014-028732

(51) Int. Cl.
*G02B 26/00* (2006.01)
*G09G 3/34* (2006.01)
(Continued)

(52) U.S. Cl.
CPC .............. *G02F 1/167* (2013.01); *G02B 26/007* (2013.01); *G02F 1/0009* (2013.01); *G02F 1/0018* (2013.01); *G02F 1/133348* (2013.01); *G02F 1/172* (2013.01); *G02F 2001/1672* (2013.01); *G02F 2001/1678* (2013.01); *G02F 2202/02* (2013.01); *G02F 2202/022* (2013.01); *G02F 2202/07* (2013.01); *G09G 3/344* (2013.01); *G09G 3/3433* (2013.01)

(58) Field of Classification Search
CPC . G02F 1/167; G02F 2001/1678; G02F 1/172; G02F 1/0009; G02F 1/0018; G02F 2001/1672; G02F 1/133348; G02F 2202/07; G02F 2202/022; G09G 3/344; G09G 3/3433; G02B 26/007
USPC ....... 359/295; 252/582; 345/85, 107; 430/32, 430/35; 204/845, 845.5, 357, 391, 405
See application file for complete search history.

(56) References Cited

U.S. PATENT DOCUMENTS

| 4,680,103 A * | 7/1987 | Beilin ................ G02F 1/167 359/296 |
| 6,858,164 B2 * | 2/2005 | Yanagisawa .......... C08F 230/08 252/586 |

(Continued)

FOREIGN PATENT DOCUMENTS

| JP | A-05-173193 | 7/1993 |
| JP | A-08-048910 | 2/1996 |

(Continued)

*Primary Examiner* — Evelyn A Lester
(74) *Attorney, Agent, or Firm* — Oliff PLC

(57) ABSTRACT

There is provided electrophoretic particle which has core particle, and a siloxane-based compound which includes a connecting structure in which a plurality of siloxane bonds are connected in series, and the surface of the core particle includes a first region to which the siloxane-based compound is bonded, and a second region in which charging characteristic derived from the core particle is expressed by exposure of the surface of the core particle. An occupancy rate of the first region on the surface of the core particle is preferably equal to greater than 0.05% and equal to or less than 20%.

15 Claims, 8 Drawing Sheets

(51) Int. Cl.
  *G02F 1/167* (2006.01)
  *G02F 1/1333* (2006.01)
  *G02F 1/17* (2006.01)
  *G02F 1/00* (2006.01)

(56) References Cited

U.S. PATENT DOCUMENTS

| | | | |
|---|---|---|---|
| 7,038,832 B2 | 5/2006 | Kanbe | |
| 7,161,732 B2 | 1/2007 | Kanbe | |
| 7,195,852 B2 * | 3/2007 | Moudry | G03G 9/125 430/114 |
| 7,880,955 B2 * | 2/2011 | Naijo | G02F 1/167 359/296 |
| 7,985,476 B2 | 7/2011 | Kurino et al. | |
| 8,961,831 B2 * | 2/2015 | Du | C09C 1/3684 252/500 |
| 2002/0149835 A1 | 10/2002 | Kanbe | |
| 2005/0168799 A1 * | 8/2005 | Whitesides | B82Y 30/00 359/296 |
| 2007/0128352 A1 * | 6/2007 | Honeyman | B82Y 30/00 427/212 |
| 2010/0148385 A1 * | 6/2010 | Balko | G02F 1/167 264/4.1 |
| 2013/0244149 A1 * | 9/2013 | Wang | G02F 1/167 430/37 |
| 2014/0011913 A1 * | 1/2014 | Du | G02F 1/167 523/205 |

FOREIGN PATENT DOCUMENTS

| | | |
|---|---|---|
| JP | A-2002-202534 | 7/2002 |
| JP | A-2007-217242 | 8/2007 |

* cited by examiner

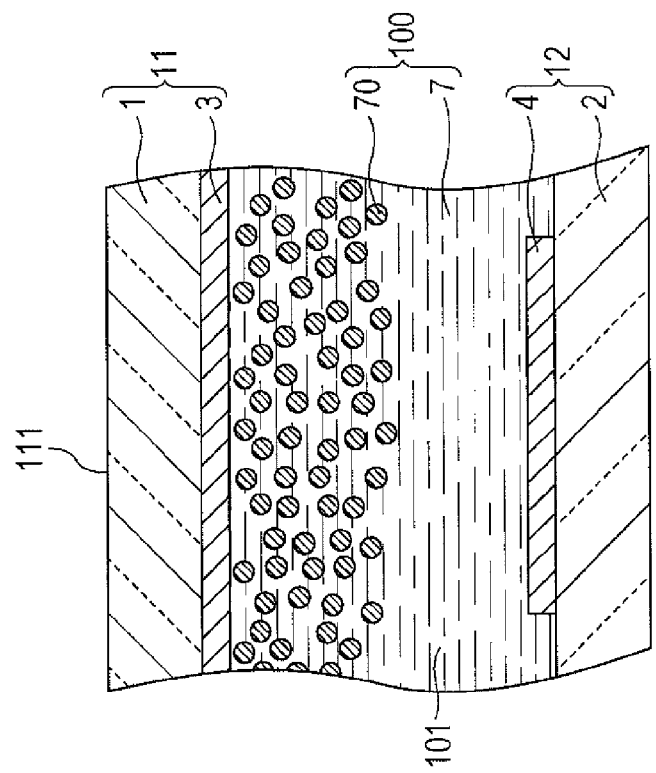
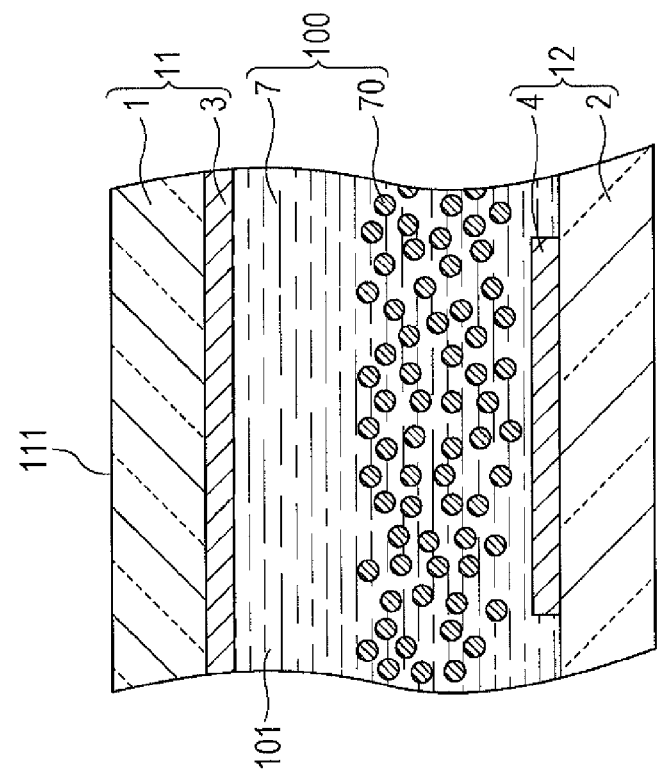

FIG. 6

| X | Y | Z |
|---|---|---|
| —NH₂ | (epoxide) | CH₃-NH-CH₂-CH(OH)-CH₂CH₃ |
| —NH₂ | —COOH | CH₃-NH-C(=O)-CH₃ |
| (epoxide) | —NH₂ | CH₃-NH-CH₂-CH(OH)-CH₂CH₃ |
| —NCO | —OH | CH₃-NH-C(=O)-O-CH₃ |
| —NCO | —NH₂ | CH₃-NH-C(=O)-NH-CH₃ |
| —SH | (epoxide) | CH₃-S-CH₂-CH(OH)-CH₂CH₃ |
| —(Si)—H | —C=C—R | CH₃-Si-CH₂-CH₂-CH₃ |

ELECTROPHORETIC PARTICLES, METHOD FOR MANUFACTURING ELECTROPHORETIC PARTICLES, ELECTROPHORESIS DISPERSION, DISPLAY DEVICE, AND ELECTRONIC APPARATUS

BACKGROUND

1. Technical Field

The present invention relates to electrophoretic particles, a method for manufacturing the electrophoretic particles, an electrophoresis dispersion, a display device, and an electronic apparatus.

2. Related Art

It is known that, in general, when an electric field is applied to an dispersion system obtained by dispersing fine particles into a liquid, the fine particles are moved (migrated) by Coulomb force in the liquid. This phenomenon is called electrophoresis, and in recent years, an electrophoresis display device which displays desired information (image) using the electrophoresis has attracted attention as a new display device (for example, refer to JP-A -2002-202534).

The electrophoresis display device has a display memory property and a wide viewing angle property in a state of stopping application of a voltage, and can display an image with high contrast with low electric power consumption.

In addition, since the electrophoresis display device is a non-emissive display device, it is gentle on the eyes compared to a display device of an emissive type such as a cathode-ray tube.

JP-A-2002-202534 discloses an electrophoresis display device having a configuration in which microcapsules filled with a colored liquid having an insulating property and charged particles are interposed between a pair of transparent electrodes.

In the electrophoresis display device, when a voltage is applied between the pair of transparent electrodes, the charged particles migrate in the colored liquid in accordance with the direction of the electric field generated between the electrodes. Thus, a color of the charged particles or a color of the colored liquid is seen to an observer.

Therefore, by patterning one or both electrodes and controlling an voltage applied thereto, it is possible to display desired information.

Meanwhile, in the electrophoresis display device, the charged particles in the colored liquid are required to be excellently dispersed. In a case where dispersibility thereof is insufficient, unintended aggregation occurs, and thus a display problem occurs.

Therefore, by introducing polymer chains on surfaces of charged particles and using a repulsive force due to steric hindrance among the polymer chains, attempts to increase the dispersibility of the charged particles have been made. However, by introducing the polymer chains, problems in that charging characteristics of the charged particles are impaired, and mobility of the charged particles is decreased occur.

SUMMARY

An advantage of some aspects of the invention is to provide electrophoretic particles in which both charging characteristics and dispersibility are achieved, a method for manufacturing the electrophoretic particles which can effectively manufacture the electrophoretic particles, a electrophoresis dispersion provided with the electrophoretic particles, a display device, and an electronic apparatus.

The invention is completed in the following manner.

Electrophoretic particles according to an aspect of the invention have particles, and a siloxane-based compound which is bonded to surfaces of the particles, and includes a connecting structure in which a plurality of siloxane bonds are connected in series, and the surfaces of the particles include a first region to which the siloxane-based compound is bonded, and a second region in which the surfaces are exposed.

Thus, the electrophoretic particles in which both charging characteristics and dispersibility can be achieved are obtained.

In the electrophoretic particles according to the aspect of the invention, the content of the siloxane-based compound is preferably equal to or greater than 0.1 parts by mass and equal to or less than 5 parts by mass with respect to 100 parts by mass of the particles.

Thus, it is possible to achieve both higher charging characteristics and dispersibility, and to more reliably suppress occurrence of display unevenness.

In the electrophoretic particles according to the aspect of the invention, an occupancy rate of the first region on the surfaces of the particles is preferably equal to or greater than 0.05% and equal to or less than 20%.

Thus, both dispersibility due to mainly the first region and charging characteristics due to mainly the second region can be further enhanced. That is, for example, it is possible to achieve both the dispersibility and the charging characteristics even under an environment in which temperature at which the electrophoresis dispersion is placed is largely changed, or even under an environment in which the intensity of the electric field is small.

In the electrophoretic particles according to the aspect of the invention, when the occupancy rate of the first region on the surfaces of the particles is A1, and an occupancy rate of the second region on the surfaces of the particles is A2, A1/A2 is preferably equal to or greater than 0.0005 and equal to or less than 0.1.

Thus, both dispersibility due to mainly the first region and charging characteristics due to mainly the second region can be further enhanced.

In the electrophoretic particles according to the aspect of the invention, the siloxane-based compound preferably has a linear molecular structure configured with a main chain including the connecting structure and a side chain bonded to the main chain.

Thus, the long-chain molecular structure of the siloxane-based compound is comparatively stably maintained, and a separation distance among the particles can be sufficiently ensured across the siloxane-based compounds, and therefore, a function of the siloxane-based compound that imparts the dispersibility to the electrophoretic particles can be further promoted. In addition, as a dispersion medium, a dispersion medium having comparatively low polarity is widely used. On the other hand, compounds including the siloxane bond also have comparatively low polarity although depending on the structure of the side chain. Therefore, the electrophoretic particles including such a siloxane-based compound exhibit particularly excellent dispersibility with respect to the dispersion medium.

In the electrophoretic particles according to the aspect of the invention, the siloxane-based compound is preferably a compound obtained by a method in which the silicone oil and the coupling agent are reacted, and a hydrolyzable group derived from the coupling agent of the obtained reaction product and the surface of the particles are subjected to a dehydration condensation reaction.

Thus, the bonding amount with respect to the particles can be easily controlled despite the fact that the siloxane-based compound contains a linear molecular structure with a long-chain, and as a result, it is possible to realize the electrophoretic particles containing the siloxane-based compound strictly controlled to be the intended amount. In other words, there are various difficulties to accurately introduce the intended amount of the siloxane-based compound containing a linear molecular structure with a long-chain to the particles, and in contrast, by interposing a structure derived from the coupling agent between the structure derived from the silicone oil and the particles, it is possible to perform a process in which an opportunity for the silicone oil and the coupling agent to react is sufficiently ensured in advance. Therefore, it is possible to effectively use the high reactivity of the coupling agent with respect to the particles, and as a result, it is possible to accurately control the introduction amount of the siloxane-based compound.

In the electrophoretic particles according to the aspect of the invention, the siloxane-based compound is preferably a compound obtained by a reaction of a functional group derived from the silicone oil and the surface of the particles.

Thus, since the majority of the siloxane-based compound is occupied by a structure derived from the silicone oil, for example, when the silicone oil or the modified product thereof is used as a dispersion medium, the dispersibility of the electrophoretic particles is particularly high.

In the electrophoretic particles according to the aspect of the invention, the siloxane-based compound preferably has a functional group capable of bonding to the surfaces of the particles at a terminal of one side of the connecting structure in a state before the siloxane-based compound is reacted with the surface of the particle.

Thus, only a terminal of one side of the connecting structure can be bonded to the surface of the particle, and only one side in a linear molecular structure of the siloxane-based compound obtained as a result of this bonding is immobilized on the surface of the particle. Therefore, it is possible to more reliably manufacture the electrophoretic particles.

In the electrophoretic particles according to the aspect of the invention, the weight average molecular weight of the siloxane-based compound is preferably equal to or greater than 1,000 and equal to or less than 100,000.

Thus, the length of the molecular structure of the siloxane-based compound is optimized, the electrophoretic particles to which dispersibility derived from the linear structure with a long-chain is sufficiently imparted can be obtained while avoiding the burial of the charging characteristics derived from the particle. That is, the electrophoretic particles which have both the dispersibility and the charging characteristics can be obtained.

In the electrophoretic particles according to the aspect of the invention, the constituent material of the surface of the particle includes an inorganic material, and the charging characteristics are preferably characteristics based on the hydroxyl group present on the surface.

Since the hydroxyl group is present in the oxides of many inorganic materials, it is significant in terms of suppressing variation in the charging characteristics of each of the particle. In addition, since bonding by a dehydration condensation reaction with many hydrolyzable groups is easily performed, there is an advantage in that the siloxane-based compound is easily introduced.

In the electrophoretic particles according to the aspect of the invention, the constituent material of the surface of the particle includes an organic material having a dissociable group, and the charging characteristics are preferably characteristics based on the dissociable group present on the surface.

Thus, a charge can be generated on the surface of the particle by dissociation of the dissociable group.

A method for manufacturing the electrophoretic particles according to another aspect of the invention includes a step of obtaining a reaction product by reacting the siloxane bond-containing material with the coupling agent, and a step of bonding the siloxane-based compound derived from the reaction product to a part of the surface by reacting the hydrolyzable group derived from the coupling agent of the reaction product with respect to the surface of the particle.

Thus, it is possible to efficiently manufacture the electrophoretic particles according to the aspect of the invention.

Then, an electrophoresis dispersion according to still another aspect of the invention has the electrophoretic particles which have the particles and the siloxane-based compound, and are configured such that the surface of the particles include the first region to which the siloxane-based compound is bonded, and the second region in which the charging characteristics derived from the particle is expressed by exposure of the surface, and the dispersion medium having a dielectric constant of equal to or greater than 1.5 and equal to or less than 3 which disperses the electrophoretic particles.

Thus, the electrophoresis dispersion which has a high insulating property, suppresses the leakage current when being supplied to the electrophoresis display device, and contributes to reduction in the electric power consumption can be obtained.

A display device according to still another aspect of the invention has an electrode substrate equipped with a substrate and the electrode, the electrophoresis dispersion according to an aspect of the invention, and a dispersion enclosing space provided at one surface side of the electrode substrate which encloses the electrophoresis dispersion.

Thus, the display device which is capable of a high-contrast display can be obtained.

An electronic apparatus according to still another aspect of the invention is equipped with the display device according to an aspect of the invention.

Thus, an electronic apparatus having high reliability can be obtained.

BRIEF DESCRIPTION OF THE DRAWINGS

The invention will be described with reference to the accompanying drawings, wherein like numbers reference like elements.

FIGS. 3A and 3B are cross-sectional views illustrating driving of the display device shown in FIG. 1.

FIG. 6 is an illustration showing examples of a reactive functional group X included in a coupling agent, examples of the reactive functional group Y included in a silicone oil, and examples of a structure Z formed by reaction thereof.

DESCRIPTION OF EXEMPLARY EMBODIMENTS

Hereinafter, electrophoretic particles, a method for manufacturing the electrophoretic particles, an electrophoresis dispersion, a display device, and an electronic apparatus according to an aspect of the invention will be described in detail on the basis of preferred embodiments shown in the accompanying drawings.

Display Device

First Embodiment

First, a first embodiment of the display device according to an aspect of the invention will be described.

Figure 1:
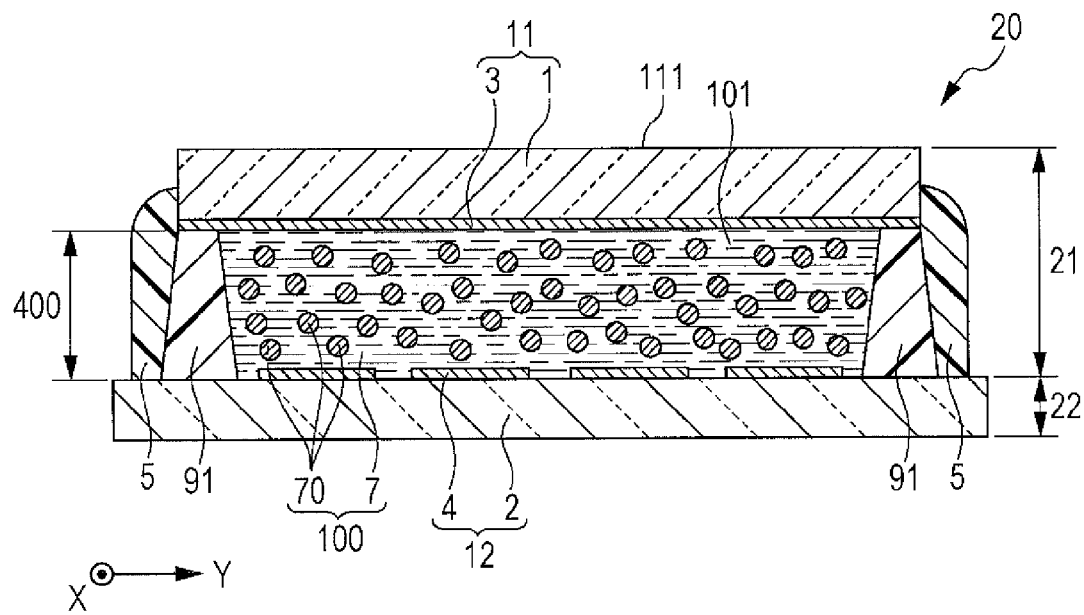
FIG. 1 is a cross-sectional view showing a first embodiment of a display device according to the invention.
Figure 2:
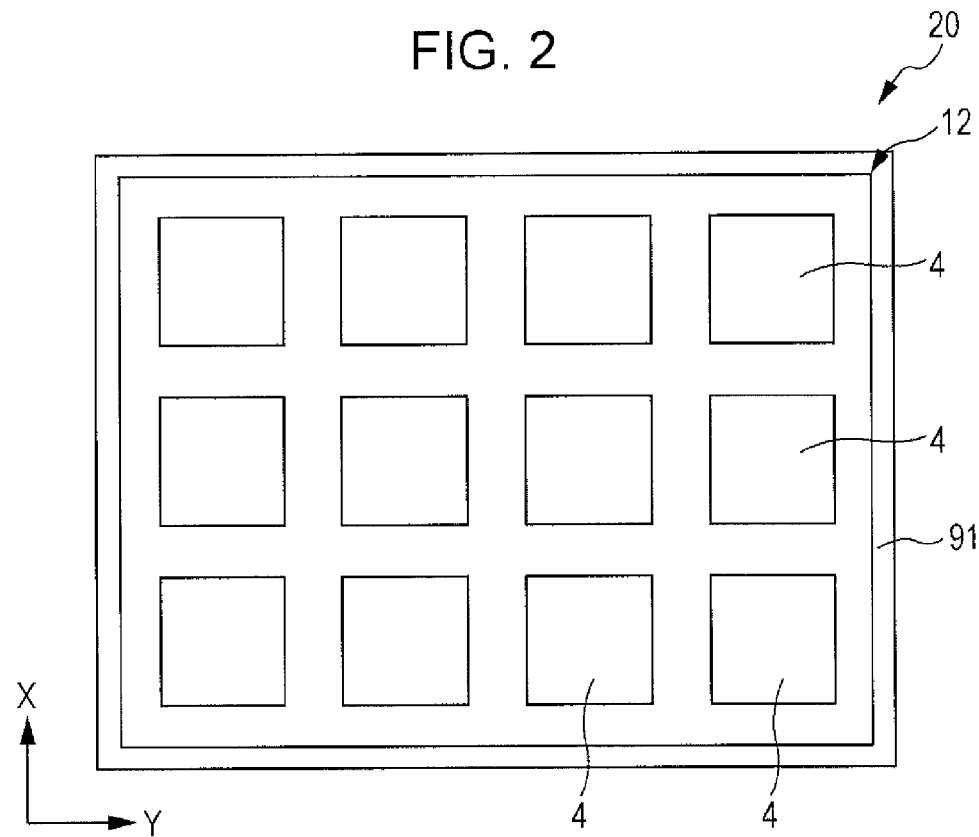
FIG. 2 is a plan view (top view) of the display device shown in FIG. 1.

FIG. 1 shows a cross-sectional view showing the first embodiment of the display device according to an aspect of the invention, FIG. 2 shows a plan view (top view) of the display device shown in FIG. 1, and FIGS. 3A and 3B show cross-sectional views illustrating driving of the display device shown in FIG. 1. Moreover, hereinafter, for convenience of explanation, the upper side in FIGS. 1, 3A, and 3B will be described as "upper", and the lower side in FIGS. 1, 3A and 3B will be described as "lower". In addition, as shown in FIG. 1, two directions perpendicular to each other in a plan view of the display device will be described as "X direction" and "Y direction".

A display device (display device according to an aspect of the invention) 20 shown in FIG. 1 is an electrophoresis display device for displaying a desired image using phoresis of particles. The display device 20 includes a display sheet (front plane) 21, and a circuit substrate (back plane) 22.

As shown in FIG. 1, the display sheet 21 includes a substrate (electrode substrate) 11 which is provided with a base portion 1 having a flat plate shape and a first electrode 3 provided on a lower surface of the base portion 1, and a display layer 400 which is provided on a lower surface of the substrate 11 and filled with a dispersion 100 including electrophoretic particles 70. In such a display sheet 21, the upper surface of the substrate 11 constitutes a display surface 111.

On the other hand, the circuit substrate 22 has a substrate 12 equipped with a base portion 2 having a flat plate shape and a plurality of second electrodes 4 provided on the upper surface of the base portion 2, and an electrical circuit (not shown) provided on the substrate 12.

For example, the electrical circuit has TFT arranged in a matrix form (switching element), a gate line formed in correspondence with the TFT and a data line, a gate driver for applying a desired voltage to the gate line, a data driver for applying a desired voltage to the data line, and a control portion for controlling driving of the gate driver and the data driver.

Hereinafter, the configuration of each portion will be sequentially described.

Substrate

Each of the base portions 1 and 2 is configured with a member having a sheet shape (flat plate shape), and has a function of supporting and protecting each member disposed therebetween. Each of the base portions 1 and 2 may be flexible or hard, and preferably has flexibility. Using the base portions 1 and 2 having the flexibility, it is possible to obtain the display device 20 having the flexibility, that is, for example, the display device 20 which is useful for constructing electronic paper.

In a case where the base portions 1 and 2 have the flexibility, as the constituent material, glass or resin with a high transparency can be exemplified. Examples of the resin include polyesters such as PET (polyethylene terephthalate) and PEN (polyethylene naphthalate), polyolefins such as polyethylene, various thermoplastic elastomers such as modified polyolefin, cyclic olefin (COP), polyamide, thermoplastic polyimide, polyether, polyether ether ketone, polycarbonate (PC), polyurethanes, and chlorinated polyethylenes, or copolymers, blends, and polymer alloys which are mainly composed of the above materials, and the resins may be used alone, or two or more kinds thereof may be used by being mixed with each other.

Each of the average thickness of the base portions 1 and 2 is suitably set depending on the constituent material and use thereof, and is not particularly limited. In a case of having the flexibility, the average thickness is preferably approximately equal to or greater than 20 μm and equal to or less than 500 μm, more preferably approximately equal to or greater 25 μm and equal to or less than 250 μm, and even more preferably approximately equal to or greater than 50 μm and equal to or less than 200 μm. Thus, it is possible to achieve miniaturization (in particular, thinning) of the display device 20 while achieving harmonization of flexibility and strength of the display device 20.

Each of the first electrode 3 and the second electrode 4 having a film shape is provided on the surfaces of the display layer 400 side of these base portions 1 and 2, that is, the lower surface of the base portion 1 and the upper surface of the base portion 2. In the embodiment, the first electrode 3 becomes a common electrode, and the second electrode 4 becomes individual electrodes (pixel electrode connected to TFT) which are divided into a zigzag pattern in the X and Y directions. In the display device 20, a region where the one of the second electrodes 4 and the first electrode 3 are overlapped each other constitutes one pixel.

The constituent material of each of the electrodes 3 and 4 is not particularly limited as long as it substantially has conductivity, and various conductive materials including metallic materials such as gold, silver, copper, aluminum, and alloys thereof, carbon-based materials such as carbon black, graphene, a carbon nanotube, and fullerene, conductive polymer materials such as polyacetylene, polyfluorene, polythiophene, and derivatives thereof, ion conductive polymer materials obtained by dispersing an ionic substances such as NaCl, $Cu(CF_3SO_3)_2$ or the like into a matrix resin including polyvinyl alcohol, or polycarbonate, and conductive oxide materials such as indium oxide (IO), indium tin oxide (ITO), fluorine-doped tin oxide (FTO), and zinc oxide (ZnO) can be exemplified. The materials may be used alone, or two or more kinds thereof may be used by being combined with each other.

In addition, each of the average thickness of the electrodes 3 and 4 is suitably set depending on the constituent material and use thereof, and is not particularly limited. The average thickness is preferably approximately equal to or greater than 0.01 μm and equal to or less than 10 μm, and more preferably approximately equal to or greater than 0.02 μm and equal to or less than 5 μm.

Here, among each of the base portions 1 and 2, and each of the electrodes 3 and 4, each of the base portion and the electrode disposed on the display surface 111 side is made to have light transmittance, that is, be substantially transparent (colorless and transparent, colored transparent or semi-transparent). In the embodiment, since the top surface of the substrate 11 constitutes the display surface 111, at least the base portion 1 and the first electrode 3 are made to be substantially transparent. Thus, it is possible to easily recognize an image displayed on the display device 20 from the display surface 111 side visually.

Sealing Portion

Between the substrates 11 and 12, a sealing portion 5 is provided along edge portions thereof. The display layer 400 is hermetically sealed by the sealing portion 5. As a result, it is possible to prevent the infiltration of moisture into the display device 20, and more reliably prevent the deterioration of display performance of the display device 20.

The constituent material of the sealing portion 5 is not particularly limited, and various resin materials including thermoplastic resins such as an acryl-base resin, a urethane-based resin, and an olefin-based resin, and thermosetting resins such as an epoxy-based resin, a melamine-based resin, a phenol-based resin, and a silicone-based resin are exemplified. The constituent material may be used alone, or two or more kinds thereof may be used by being combined with each other.

In addition, the height of the sealing portion 5, which is not particularly limited, is preferably approximately equal to or greater than 5 μm and equal to or less than 50 μm.

Wall Portion

As shown in FIG. 1, the display layer 400 has a wall portion (partition wall) 91 provided so as to surround the outer edge, a space (dispersion enclosing space) 101 defined and formed by the substrate 11, the substrate 12, and the wall portion 91, and the dispersion 100 filled in the space 101.

If necessary, various water-repellent treatments such as a fluorocarbon plasma treatment may be applied on the surface of the wall portion 91. Thus, as described below, it is possible to obtain the display device 20 which can be more simply manufactured, and exhibit more excellent display characteristics and reliability.

The constituent material of the wall portion 91 is not particularly limited, and various thermoplastic resins and thermosetting resins such as an epoxy resin, an acrylic resin, a phenolic resin, a urea resin, a melamine resin, polyester (unsaturated polyester), polyimide, a silicone resin, and a urethane resin can be exemplified. The constituent materials may be used alone, or two or more kinds thereof may be used by being mixed with each other.

The height of the wall portion 91, which is not particularly limited, is preferably approximately equal to or greater than 5 μm and equal to or less than 50 μm. By making the height of the wall portion 91 to be within the above-described range, electrophoretic particles 70 can migrate in a short period of time according to the electric field, and it is possible to prevent the electrophoretic particles 70 from being seen through in a non-display state.

In addition, the average width of the wall portion 91 can be suitably set in consideration of the mechanical strength required for the wall portion 91, and is preferably approximately equal to or greater than 1 μm and equal to or less than 5 μm. Then, the aspect ratio (average height/average width) of the wall portion 91 is preferably approximately 1 to 50.

In addition, in the embodiment, the cross-sectional shape of the wall portion 91 is a reverse tapered shape whose width gradually decreases toward the substrate 11 side from the substrate 12, and is not limited to the shape thereof. For example, a rectangular shape may be used.

In addition, the cross-sectional shape of the wall portion 91 may not be constant throughout, and may be a different shape in part. In this case, since the air-tightness of the space 101 is reduced at this point, it is possible to discharge the bubbles to the outside even if bubbles are mixed in the space 101.

Dispersion

The dispersion 100 includes a dispersion medium 7, and the electrophoretic particles 70 dispersed in the dispersion medium 7.

The color that the electrophoretic particles 70 exhibit, is not particularly limited as long as it is different from the color that the dispersion medium 7 exhibits, and for example, in a case where the color that the dispersion medium 7 exhibits is a light color or white, the color that the electrophoretic particles 70 exhibit is preferably a dark color or black, and in contrast, in a case where the color that the dispersion medium 7 exhibits is a dark color or black, the color that the electrophoretic particles 70 exhibit is preferably a light color or white. Thus, since the lightness difference between the electrophoretic particles 70 and the dispersion medium 7 becomes large, for example, in a case of where the electrophoretic particles 70 are collected locally, the lightness difference between the region and the adjacent region thereof (region occupied by the dispersion medium 7) is also increased, and therefore, by controlling the collected region of the electrophoretic particles 70, high-contrast display is possible.

As the dispersion medium 7, a dispersion medium having a high boiling point of 100° C. or higher and comparatively high insulating property is preferably used. Examples of such dispersion medium 7 include various waters (for example, distilled water and pure water), alcohols such as butanol and glycerin, cellosolves such as butyl cellosolve, esters such as butyl acetate, ketones such as dibutyl ketone, aliphatic hydrocarbons (liquid paraffins) such as pentane, alicyclic hydrocarbons such as cyclohexane, aromatic hydrocarbons such as xylene, halogenated hydrocarbons such as methylene chloride, aromatic heterocyclic compounds such as pyridine, nitriles such as acetonitrile, amides such as N,N-dimethylformamide, carboxylate, silicone oils or other various oils, and these dispersion media may be used alone, or may be used by being mixed with each other.

Among these, as the dispersion medium 7, a dispersion medium of which the main component is the aliphatic hydrocarbons (liquid paraffin) or the silicone oils is preferable. Since in the dispersion medium 7 of which the main component is the liquid paraffin or the silicone oils, the aggregation suppressing effect of the electrophoretic particles 70 is high, it is possible to suppress the display performance of the display device 20 from being deteriorated over time. In addition, since the liquid paraffins or the silicone oils do not contain unsaturated bonds, the liquid paraffins or the silicone oils have advantages that weather resistance is excellent, and safety is high.

In addition, a dielectric constant of the dispersion medium 7 is preferably equal to or greater than 1.5 and equal to or less than 3, and more preferably equal to or greater than 1.7 and equal to or less than 2.8. Such a dispersion medium 7 is excellent in dispersibility of the electrophoretic particles 70 including a siloxane-based compound 72, and is also excellent in an electrical insulating property. Therefore, the dispersion medium 7 contributes to the realization of the display device 20 of which power consumption is low, and which is capable of high-contrast display. In addition, the values of the dielectric constant are values measured at a measurement frequency of 50 Hz, and, are values measured for the dispersion medium 7 of which the water content contained is equal to or less than 50 ppm at a temperature of 25° C.

Hereinbefore, the configuration of the display device 20 has been described, and for example, such a display device 20 is driven in the following manner. In addition, in the following description, a case of applying a voltage to one among a plurality of the second electrodes 4 shown in FIG. 1 will be described. In addition, in the following description, it is assumed that the electrophoretic particles 70 are positively charged.

When a voltage at which the second electrode 4 becomes a negative potential is applied between the first electrode 3 and the second electrode 4, the electric field generated by the applied voltage is applied to the electrophoretic particles 70 in the display layer 400. Then, the electrophoretic particles 70 migrate to the second electrode 4 side to collect. Thus, as shown in FIG. 3A, the color that the dispersion medium 7 exhibits is mainly displayed on the display surface 111.

On the other hand, when a voltage at which the second electrode 4 becomes a positive potential is applied, the electric field generated by the applied voltage is applied to the electrophoretic particles 70 in the display layer 400. Then, the electrophoretic particles 70 migrate to the first electrode 3 side to collect. Thus, as shown in FIG. 3B, the color that the electrophoretic particles 70 exhibit is mainly displayed on the display surface 111.

By performing driving of the electrophoretic particles 70 as described above for each pixel (each of the second electrodes 4), respectively, it is possible to display a desired image on the display surface 111.

Moreover, if necessary, a plasticizer, a viscosity modifier, an electrolyte, a surfactant, a lubricant, or a stabilizer may be added to the dispersion medium 7, in addition to various dyes such as anthraquinone-based dyes, azo-based dyes, and indigoid-based dyes.

Electrophoretic Particles

Here, the electrophoretic particles 70 contained in the dispersion 100 will be described.

Figure 4:
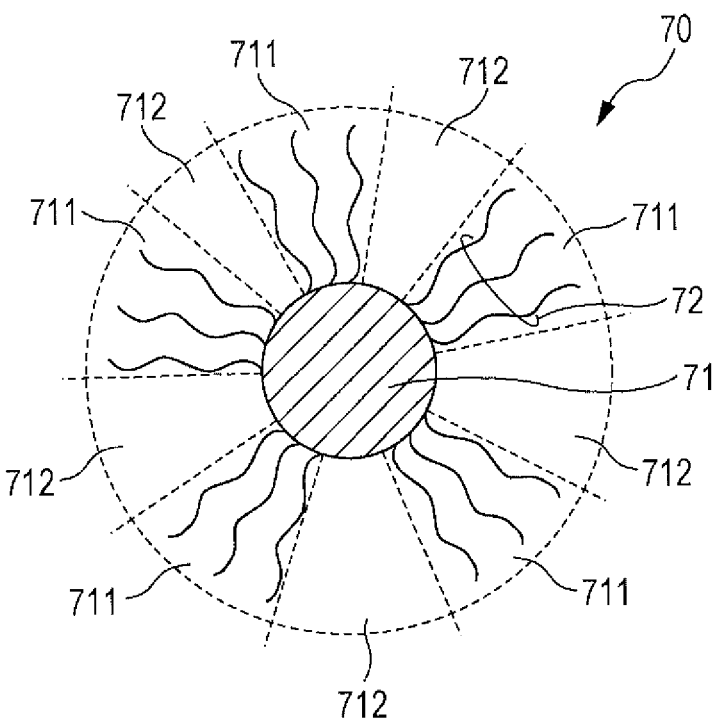
FIG. 4 is a cross-sectional view schematically showing a structure of a siloxane-based compound bonded to a first region in electrophoretic particles according to the first embodiment.

FIG. 4 is a cross-sectional view schematically showing a structure of a siloxane-based compound 72 bonded to a first region 711 in the electrophoretic particles 70 according to the embodiment.

In the display device 20, as described above, the electrophoretic particles 70 migrate according to the direction of the electric field, and by the difference in chromaticity and lightness generated by it, an image display is performed. At this time, in order to perform an excellent image display, it is necessary for a plurality of the electrophoretic particles 70 to stably exist without aggregating with each other in the dispersion medium 7, and to quickly migrate when the electric field is generated. That is, the electrophoretic particles 70 are required to have both the dispersibility and the charging characteristics.

Therefore, the present inventors have repeatedly conducted intensive studies for the electrophoretic particles 70 to meet such a demand. Then, the present inventors found that, as shown in FIG. 4, if the electrophoretic particles (the electrophoretic particles according to an aspect of the invention) 70 have core particles 71 and the siloxane-based compound 72, and are configured to include the first region 711 in which the siloxane-based compound 72 is bonded to the surface of the core particle 71 and a second region 712 in which charging characteristics derived from the core particle 71 are expressed since the surface of the core particle 71 is exposed just as it is, the above-described demand can be sufficiently satisfied, and have completed the invention.

That is, since the siloxane-based compound 72 which is bonded to the first region 711 inhibits such electrophoretic particles 70 to significantly approach to other electrophoretic particles 70, appropriate dispersibility is imparted, and by exposure of the surface of the core particle 71 expressed in the second region 712, the charging characteristics derived from the core particle 71 are expressed without being buried. In other words, the first region 711 and the second region 712 on the surface of the core particle 71 coexist, and the surface of the core particle 71 is not completely covered with the siloxane-based compound 72 but sparsely covered with a coating film containing the siloxane-based compound 72. Therefore, aggregation among the electrophoretic particles 70 is suppressed by a constant repulsion caused by the first region 711, by this, migration resistance of the electrophoretic particles 70 is decreased, a constant Coulomb force is generated in the electrophoretic particles 70 by the presence of the second region 712, and therefore, sufficient electrophoresis is possible even in a weak electric field. As a result, it is possible to obtain an image display with a high responsiveness by low power consumption.

In addition, since the dispersibility is imparted to the electrophoretic particles 70 by the siloxane-based compound 72, it is possible to reduce the amount of a dispersant added in the dispersion 100, or the dispersant does not need to be added at all. Therefore, it is possible to suppress the deterioration of insulating property, between the first electrode 3 and the second electrode 4, which occurs when a large amount of dispersant is added. Thus, generation of leakage current when a voltage is applied is suppressed, and it is possible to reduce the power consumption of the display device 20.

Examples of the dispersant include polyamide amine and salt thereof, basic functional group-modified polyurethane, basic functional group-modified polyester, basic functional group-modified poly(meth)acrylate, polyoxyethylene alkyl amine, alkanolamine, and polyacrylamide, and the dispersants may be used alone, or two or more kinds thereof may be used by being mixed with each other.

The added amount of the dispersant is preferably equal to or less than 0.3% by mass, and more preferably equal to or less than 0.1% by mass of the dispersion medium 7. By suppressing the added amount of the dispersant within the above-described range, it is possible to suppress the deterioration of the insulating property between the first electrode 3 and the second electrode 4 to be a minimum even when the dispersant is added.

Figure 5A:
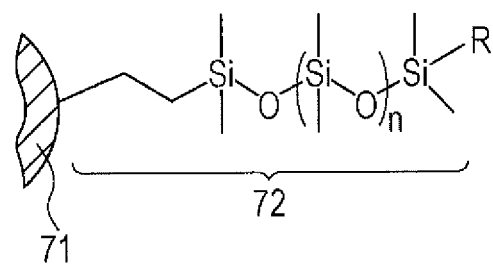
FIGS. 5A and 5B are partial enlarged views of a cross-sectional view shown in FIG. 4.
Figure 5B:
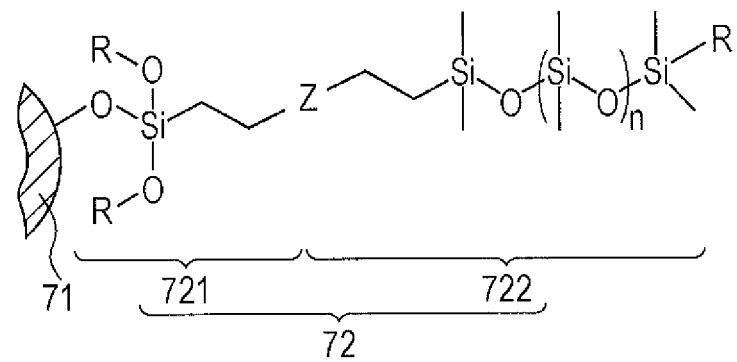

FIGS. 5A and 5B are partial enlarged views of a cross-sectional view shown in FIG. 4. Moreover, structures of the siloxane-based compound 72 shown in FIGS. 5A and 5B are only examples, and are not limited to the structures shown.

The siloxane-based compound 72 may be any compound as long as a compound contains a connecting structure in which a plurality of siloxane bonds are connected in series, and a compound having a linear molecular structure configured with a main chain including the connecting structure, and a side chain bonded to the main chain is preferable. In such a compound, the long-chain molecular structure of the siloxane-based compound 72 is comparatively stably maintained, and a separation distance among the core particles 71 can be sufficiently ensured across the siloxane-based compounds 72, and therefore, a function of the siloxane-based compound 72 that imparts the dispersibility to the electrophoretic particles 70 can be further promoted.

In addition, as the dispersion medium 7, a dispersion medium having comparatively low polarity is widely used. On the other hand, compounds including the siloxane bond also have comparatively low polarity in many cases although it depends on the structure of the side chain. Therefore, the electrophoretic particles 70 including such a siloxane-based compound 72 exhibit particularly excellent dispersibility with respect to the dispersion medium 7.

In addition, the siloxane-based compound 72 preferably contains a silicone oil or a structure derived from the modified product thereof. Since the silicone oil or the modified product thereof is also used as the dispersion medium 7 in many cases, when the siloxane-based compound 72 contains a structure derived from the silicone oil or the modified product, the dispersibility of the electrophoretic particles 70 is particularly high.

FIG. 5A shows an example of the siloxane-based compound 72 containing a structure derived from the silicone oil. In the example, the main chain configured with siloxane bonds is connected to the core particle 71 via a hydrocarbon structure. Since the majority of the siloxane-based compound 72 is occupied by a structure derived from the silicone oil, for example, when the silicone oil or the modified product thereof is used as the dispersion medium 7, the dispersibility of the electrophoretic particles 70 is particularly high.

On the other hand, FIG. 5B shows one example of a compound obtained by a method in which the silicone oil and the coupling agent are reacted, and a hydrolyzable group derived from the coupling agent of the obtained reaction product and the surface of the core particle 71 are subjected to dehydration condensation reaction. In the example, the structure 722 derived from the silicone oil is connected to the core particle 71 via the structure 721 derived from the coupling agent. The bonding amount of the siloxane-based compound 72 having such a structure with respect to the core particle 71 can be easily controlled despite the fact that the siloxane-based compound 72 contains a linear molecular structure with a long-chain, and as a result, it is useful from the viewpoint that the electrophoretic particles 70 containing the siloxane-based compound 72 strictly controlled to be the intended amount can be realized. In other words, there are many difficulties to accurately introduce the intended amount of the siloxane-based compound 72 containing a linear molecular structure with a long-chain to the core particle 71, and in contrast, by interposing the structure 721 derived from the coupling agent between the structure 722 derived from the silicone oil and the core particle 71, it is possible to perform a process in which a opportunity for the silicone oil and the coupling agent to react is sufficiently ensured in advance. Therefore, it is possible to effectively use the high reactivity of the coupling agent with respect to the core particle 71, and as a result, it is possible to accurately control the introduction amount of the siloxane-based compound 72.

In addition, the siloxane-based compound 72 as described above is obtained by introducing a compound containing the connecting structure as described above into the surface of the core particle 71, and the compound in the state before the introduction preferably has a functional group capable of bonding to the surfaces of the core particles 71 at a terminal of one side of the connecting structure. In such a compound, only a terminal of one side of the connecting structure can be bonded to the surface of the core particle 71, and only one side in a linear molecular structure of a siloxane-based compound 72 obtained as a result of this bonding is immobilized on the surface of the core particle 71. Therefore, it is possible to more reliably manufacture the electrophoretic particles 70 having the structure shown in FIG. 4.

The weight average molecular weight of the siloxane-based compound 72 is preferably approximately equal to or greater than 1,000 and equal to or less than 100,000, and more preferably approximately equal to or greater than 3,000 and equal to or less than 60,000. When the weight average molecular weight of the siloxane-based compound 72 is set within the above-described range, the length of the molecular structure of the siloxane-based compound 72 is optimized, the electrophoretic particles 70 to which dispersibility derived from the linear structure with a long-chain is sufficiently imparted can be obtained while avoiding the burial of the charging characteristics derived from the core particle 71. That is, the electrophoretic particles 70 which have both the dispersibility and the charging characteristics can be obtained.

Moreover, the weight average molecular weight of the siloxane-based compound 72 is a weight average molecular weight in terms of polystyrene measured using a gel permeation chromatography (GPC).

Moreover, each of n in FIGS. 5A and 5B is preferably approximately equal to or greater than 5 and equal to or less than 2,000, and more preferably approximately equal to or greater than 20 and equal to or less than 1,500 for the same reason as the weight average molecular weight as described above.

In addition, a structure Z in FIG. 5B is formed by reaction of a reactive functional group X included in the coupling agent with a reactive functional group Y included in the silicone oil.

FIG. 6 is an illustration showing examples of the reactive functional group X included in the coupling agent, examples of the reactive functional group Y included in the silicone oil, and examples of the structure Z formed by reaction thereof, respectively. R in FIGS. 5A, 5B, and 6 represents an aliphatic hydrocarbon group such as an alkyl group or a hydrogen atom.

In addition, the terminals and the side chains of the siloxane-based compound 72 are preferably configured with substituents having low polarity. Thus, it is possible to further increase the dispersibility of the electrophoretic particles 70. As the specific substituent, an alkyl group can be exemplified.

On the other hand, the charging characteristics derived from the core particle 71 in the second region 712 are characteristics based on the polarity and the magnitude of the charge generated by dissociation of functional groups (dissociable group) present on the surface of the core particle 71. Therefore, in order to dissociate the dissociable group, it is necessary to expose the second region 712.

Here, dissociable groups present on the surface of the core particle 71 is not particularly limited, and a hydroxyl group, a carboxyl group, a phosphate group, and a sulfo group can be exemplified. Among these, the hydroxyl group is particularly preferable. Since the hydroxyl group is present in the oxides of many inorganic materials, it is significant in terms of suppressing variation in the charging characteristics of each of the core particle 71. In addition, since bonding by a dehydration condensation reaction with many hydrolyzable groups is easily performed, there is an advantage in that the siloxane-based compound 72 is easily introduced.

Therefore, the surface of the core particle 71 preferably contains at least an inorganic material.

On the other hand, in a case where an organic material is included in the surface of the core particle 71, by using a material containing the dissociable group described above as the organic material, the dissociable group can be exposed on the surface of the core particle 71. Also in this case, a charge can be generated on the surface of the core particle 71 by dissociation of the dissociable group.

In addition, occupancy rate (coverage) of the first region 711 on the surface of the core particle 71 is preferably equal to or greater than 0.05% and equal to or less than 20%, more preferably equal to or greater than 0.1% and equal to or less than 10%, and even more preferably equal to or greater than 0.2% and equal to or less than 5%. When the occupancy rate of the first region 711 is set within the above-described range, both the dispersibility due to mainly the first region 711 and the charging characteristics due to mainly the second region 712 can be further enhanced. That is, for example, it is possible to achieve both the dispersibility and the charging characteristics even under an environment in which temperature at which the dispersion 100 is placed is largely changed, or even under an environment in which the intensity of the electric field is small. In addition, when the occupancy rate of the first region 711 is set within the above-described range, the variation of the dispersibility and the charging characteristics among the electrophoretic particles 70 can be suppressed. Therefore, behavior of the electrophoretic particles 70 when an electric field is applied is easily arranged, and thus, it is possible to suppress the occurrence of, a so-called, display unevenness.

In addition, in a case where the occupancy rate of the first region 711 is less than the lower limit, there is a concern that dispersibility is lowered, and thus the electrophoretic particles 70 aggregate depending on the environment in which the dispersion 100 is placed. In contrast, in a case where the occupancy rate of the first region 711 is greater than the upper limit, the charging characteristics of the core particle 71 is buried by the siloxane-based compound 72, and in a case where the intensity of the electric field is low, there is a concern that the mobility of the electrophoretic particles 70 is reduced.

In addition, if necessary, a third region in addition to the first region 711 and the second region 712 may be present on the surface of the core particle 71. The third region is a region to which a compound other than the siloxane-based compound 72 is bonded. As the compound other than the siloxane-based compound 72, a hydrocarbon chain can be exemplified. Moreover, even in a case where the third region is present, the occupancy rate (coverage) is preferably equal to or less than 5%.

Furthermore, even in a case where the third region is present, when the occupancy rate (coverage) of the first region 711 on the surface of the core particle 71 is A1, and the occupancy rate of the second region 712 on the surface of the core particle 71 is A2, A1/A2 is preferably equal to or greater than 0.0005 and equal to or less than 0.1, more preferably equal to or greater than 0.001 and equal to or less than 0.05, and even more preferably equal to or greater than 0.003 and equal to or less than 0.03. When the A1/A2 is set within the above-described range, as the above-described, both the dispersibility due to mainly the first region 711 and the charging characteristics due to mainly the second region 712 can be further enhanced.

Moreover, when the area occupied by one molecule of siloxane-based compound 72 bonded to the surface of the core particle 71 is defined as the "unit area", and the number of molecules of the siloxane-based compound 72 bonded to the surface of the core particle 71 is defined as the "number of molecules", the occupancy rate (coverage) [%] of the first region 711 on the surface of the core particle 71 can be determined by the following formula.

Occupancy rate(coverage)=(unit area×number of molecules)/(surface area of core particle)×100

Here, "unit area" can be calculated from the molecular structure of the siloxane-based compound 72.

In addition, the "number of molecules" can be calculated from the mass [g] of the siloxane-based compound 72 bonded to one core particle, the molecular weight [g/mol] of the siloxane-based compound 72, and the number of molecules of $6.02 \times 10^{23}$ [molecules/mol] per a mole.

On the other hand, in a case where the siloxane-based compound 72 is solely introduced with respect to the core particle 71, the occupancy rate A2 of the second region 712 on the surface of the core particle 71 can be obtained as the remainder of the occupancy rate A1.

Moreover, when the amount of the core particle 71 present is 100 parts by mass, the amount of siloxane-based compound 72 present is preferably equal to or greater than 0.1 parts by mass and equal to or less than 5 parts by mass, and more preferably equal to or greater than 0.5 parts by mass and equal to or less than 4 parts by mass. Thus, since the occupancy rate of the first region 711 on the surface of the core particle 71 can be reliably fitted within the above-described range, effect as described above is reliably exerted. Specifically, it is possible to achieve both higher dispersibility and higher charging characteristics, and to more reliably suppress occurrence of the display unevenness.

In addition, as the core particle 71, any one can be used as long as it has a charge, and oxide-based particles such as titanium oxide, zinc oxide, iron oxide, chromium oxide, and zirconium oxide, nitride-based particles such as silicon nitride and titanium nitride, sulfide-based particles such as zinc sulfide, boride-based particles such as titanium boride, inorganic pigment particles such as strontium chromate, cobalt aluminate, copper chromite, and ultramarine, and organic pigment particles such as an azo-based pigment, a quinacridone-based pigment, an anthraquinone-based pigment, a dioxazine-based pigment, and a perylene-based pigment can be used as the core particle. In addition, resin particles (organic material particles) configured with an acryl-based resin, a urethane-based resin, a urea-based resin, an epoxy-based resin, polystyrene, or polyester, or composite particles obtained by coating the above-described inorganic pigment particles with these resin materials (organic materials), and composite particles obtained by coating the surfaces of the resin particles with the pigment can also be used as the core particle.

In addition, the average particle diameter of the core particle 71 is not particularly limited, preferably equal to or greater than 10 nm and equal to or less than 500 nm, and more preferably equal to or greater than 20 nm and equal to or less than 300 nm. When the average particle diameter of the core particle 71 is set within the above-described range, it is possible to achieve both a display of sufficient chromaticity by the electrophoretic particles 70 and a rapid electrophoresis of the electrophoretic particles 70. As a result, it is possible to achieve both a high-contrast display and a high response speed.

In addition, when the average particle diameter of the core particle 71 is set within the above-described range, it is possible to suppress the variation of precipitation or a migration speed of the electrophoretic particles 70 and to suppress the occurrence of a display unevenness or a display defect.

Moreover, the average particle diameter of the core particle 71 means a volume average particle diameter measured using a dynamic light scattering particle size analyzer (for example, product name: LB-500, manufactured by Horiba, Ltd.).

In addition, in the embodiment, a case in which one kind of the core particles 71 is included in the dispersion 100 has been described, and a plural kinds of the core particles 71 may be included. In this case, for example, by selecting plural kinds of the core particles 71 in combination in which lightness and chromaticity are significantly different such as white and black, or such as a light color and a dark color, a display having more excellent contrast is possible.

Second Embodiment

Next, a second embodiment of the display device according to an aspect of the invention will be described.

Figure 7:
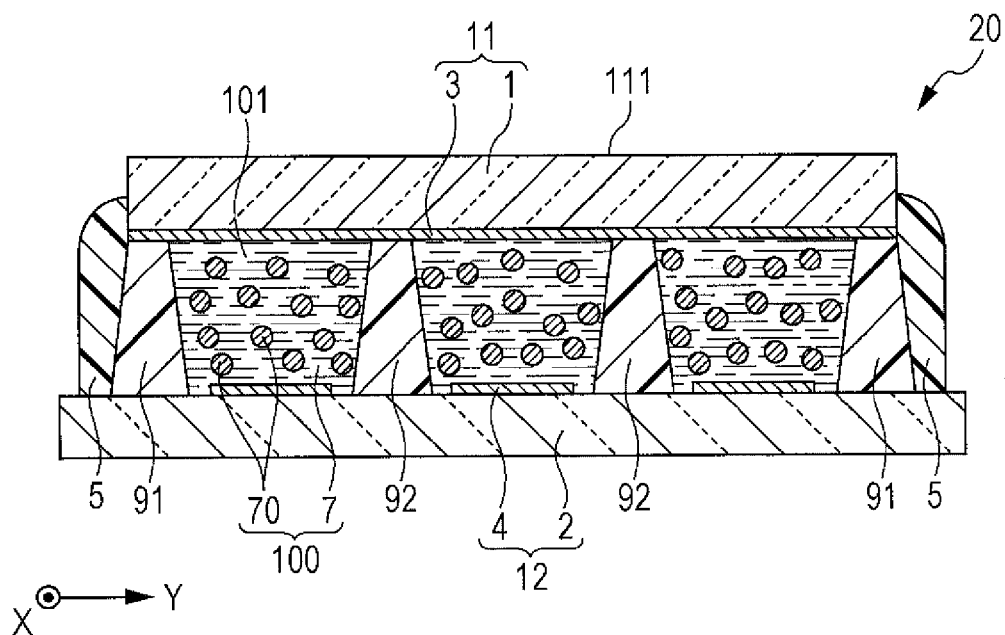
FIG. 7 is a cross-sectional view showing a second embodiment of the display device according to the invention.

FIG. 7 is a cross-sectional view showing a second embodiment of the display device according to an aspect of the invention. Moreover, hereinafter, for convenience of explanation, the upper side in FIG. 7 will be described as "upper", and the lower side in FIG. 7 will be described as "lower".

Next, the second embodiment will be described while focusing on the difference from the first embodiment, and the description of the same contents will not be repeated. Moreover, the same reference numerals are given to the same configurations as those in the first embodiment described above.

The display device 20 according to the second embodiment is the same as the display device 20 according to the first embodiment except that the display device 20 according to the second embodiment includes a wall portion 92 which divides the space 101 inside the wall portion 91 into a plurality of compartments.

That is, in the display layer 400, a plurality of the wall portions 92 having a predetermined interval is provided in the Y-direction. In addition, although not shown, in the display layer 400, a plurality of the wall portions having a predetermined interval is provided in the X-direction also. Thus, in the space 101, the pixel compartments divided into a grid pattern is formed.

In each pixel compartment, the second electrode 4 is disposed in correspondence with the pixel compartment, respectively. Therefore, by suitably controlling the voltage applied to the second electrode 4, it is possible to control the color that each pixel compartment emits, and freely generate an image to be viewed from the display surface 111.

The wall portion 92 is configured to have the same structure as the wall portion 91 described above, and the average width thereof may be smaller than that of the wall portion 91. Thus, it is possible to enhance an aperture ratio of pixels.

Moreover, the same action and effect as the first embodiment can be also obtained by the second embodiment.

Third Embodiment

Next, a third embodiment of the display device according to an aspect of the invention will be described.

Figure 8:
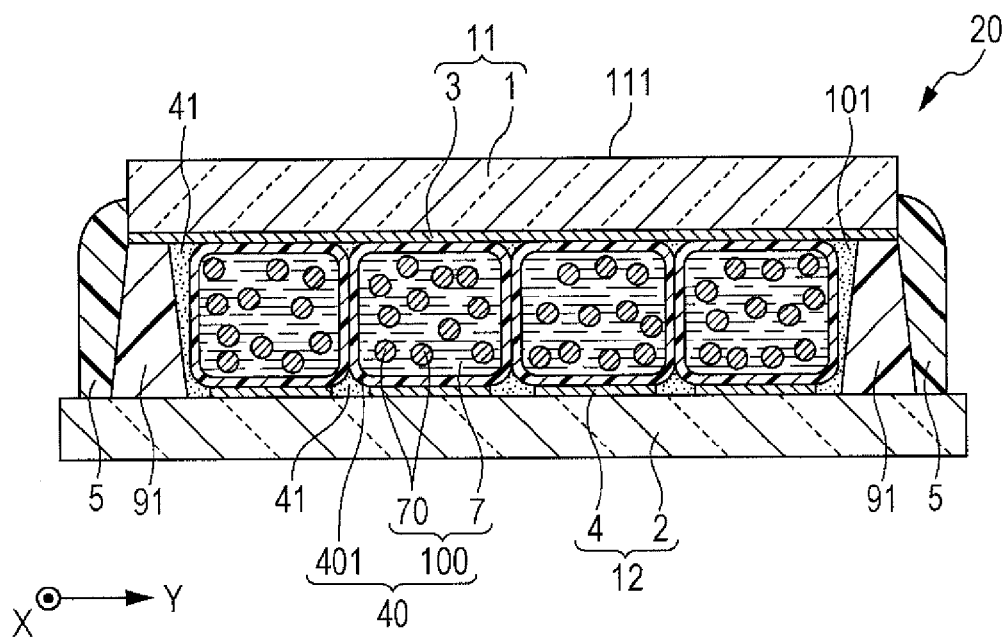
FIG. 8 is a cross-sectional view showing a third embodiment of the display device according to the invention.

FIG. 8 is a cross-sectional view showing a third embodiment of the display device according to an aspect of the invention. Moreover, hereinafter, for convenience of explanation, the upper side in FIG. 8 will be described as "upper", and the lower side in FIG. 8 will be described as "lower".

Next, the third embodiment will be described while focusing on the difference from the first and second embodiments, and the description of the same contents will not be repeated. Moreover, the same reference numerals are given to the same configurations as those in the first embodiment described above.

The display device 20 according to the embodiment is the same as the display device 20 according to the first embodiment except that the display device 20 according to the embodiment includes microcapsules 40 in which the dispersion 100 is enclosed in a capsule body (shell) 401.

That is, the display device 20 according to the embodiment is configured such that a plurality of microcapsules 40 in which the dispersion 100 is enclosed in the capsule body 401 are fixed (hold) in the space 101 by a binder 41.

The microcapsules 40 are arranged so as to spread in the X and Y directions in a single layer (one by one without overlapping in the thickness direction) between the substrates 11 and 12.

Examples of the constituent material of the capsule body (shell) 401 include gelatin and composite materials of gum arabic and gelatin, and various resin materials such as a urethane-based resin, a melamine-based resin, a urea-based resin, an epoxy-based resin, a phenol-based resin, an acryl-based resin, an olefin-based resin, polyamide, and polyether, and the constituent materials may be used alone, or two or more kinds thereof may be used by being combined with each other.

In addition, the capsule body 401 may be configured with a laminate of a plurality of layers. In this case, as the constituent material of an innermost layer, amino resins such as the melamine-based resin and the urea-based resin, or the composite resins thereof can be preferably used. On the other hand, as a constituent material of an outermost layer, an epoxy-based resin can be preferably used.

In addition, in the constituent material of the capsule body 401, a crosslinking (three-dimensional cross-linking) may be formed by a crosslinking agent. Thus, it is possible to improve the strength of the capsule body 401 while maintaining flexibility. As a result, it is possible to prevent the microcapsules 40 from being easily broken.

The size of the microcapsules 40 is preferably substantially uniform. Thus, in the display device 20, occurrence of the display unevenness can be prevented or reduced, and more excellent display performance can be exhibited.

In addition, the microcapsules 40 are preferably present in a spherical shape. Thus, the microcapsules 40 become excellent in a pressure resistance and a bleeding resistance. Therefore, while operating the display device 20 as described above or while keeping the display device 20, even in a case where impact is added to the display device 20 or the display surface 111 is pressed down, it is possible to prevent the microcapsules 40 from being destroyed, or prevent the dispersion 100 from being dissipated, and thus, the display device 20 can be stably operated for a long period of time.

Moreover, the average particle diameter of the microcapsules 40 is preferably approximately equal to or greater than 5 μm and equal to or less than 50 μm, and more preferably approximately equal to or greater than 10 μm and equal to or less than 30 μm. When the average particle diameter of the microcapsules 40 is set within the above-described range, it is possible to more reliably control electrophoresis of the electrophoretic particles 70 in the display device 20. That is, even when a pulsed electric field is applied to the electrophoretic particles 70, the electrophoretic particles 70 can reliably migrate to an end portion of the microcapsules 40. As a result, it is possible to enhance a display contrast.

For example, the binder 41 is supplied for the purpose of bonding the substrates 11 and 12, purpose of fixing the microcapsules 40 between the substrates 11 and 12, and purpose of ensuring an insulating property between the first electrode 3 and the second electrode 4. Thus, it is possible to further improve the durability and the reliability of the display device 20.

In the binder 41, a resin material (a resin material having insulating property or a resin material in which only slight current flows) which has excellent affinity (adhesiveness) with the substrates 11, 12, and the capsule body 401 (the microcapsule 40), and an excellent insulating property is preferably used.

As the binder 41, various resin materials such as thermoplastic resins such as polyethylene, polypropylene, an ABS resin, a methacrylic ester resin, a methyl methacrylate resin, a vinyl chloride resin, and a cellulose-based resin, a silicone-based resin, and a urethane-based resin can be exemplified, and the resins may be used alone, or two or more kinds thereof may be used by being combined with each other.

As described above, the display device 20 according to the present embodiment exhibits the same action and effect as those of the first and second embodiments.

Method for Manufacturing Electrophoretic Particles

Next, an embodiment of a method for manufacturing the electrophoretic particles according to an aspect of the invention will be described.

Figure 9A:
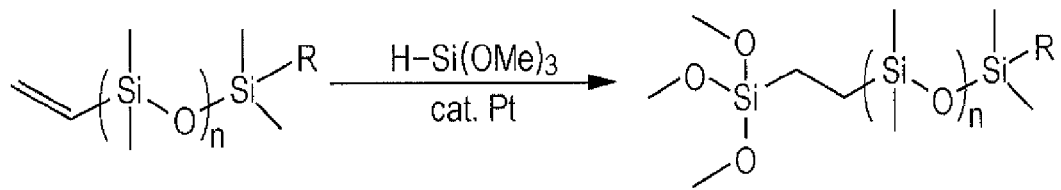
FIGS. 9A and 9B are diagrams for illustrating one embodiment of a method for manufacturing the electrophoretic particles according to the invention.
Figure 9B:
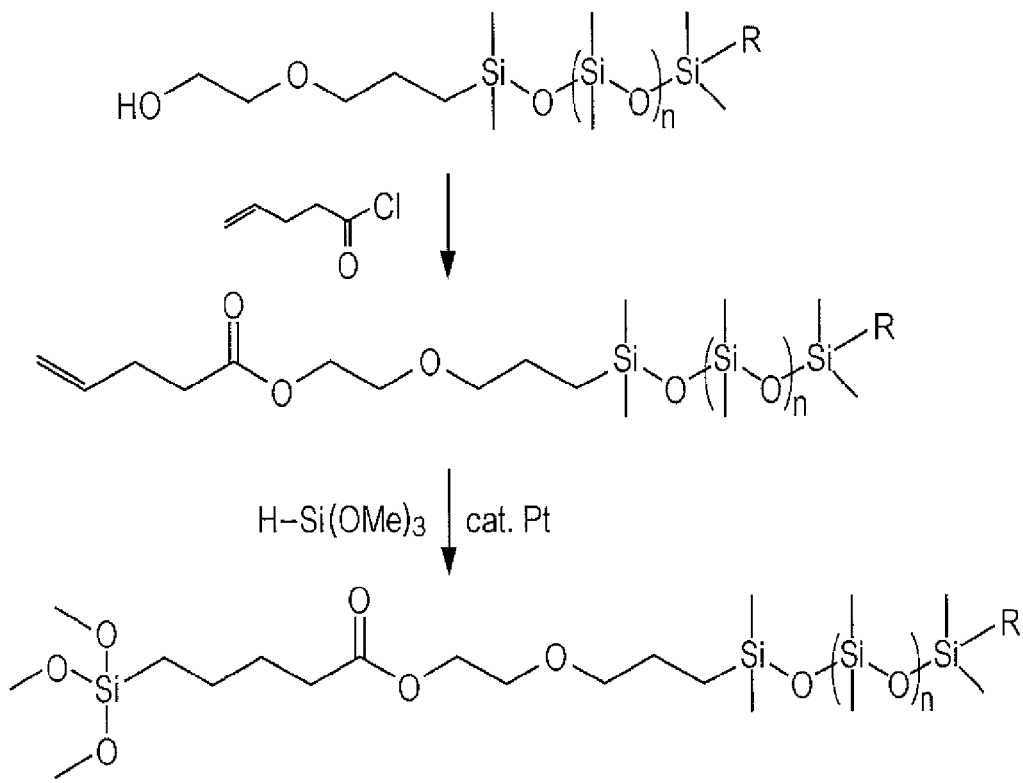

FIGS. 9A and 9B are diagrams for illustrating an embodiment of the method for manufacturing the electrophoretic particles according to an aspect of the invention.

The method for manufacturing the electrophoretic particles according to the embodiment includes a step of obtaining a reaction product by reacting a siloxane bond-containing material with a coupling agent, and a step of bonding the siloxane-based compound derived from the reaction product to a part of the surface by reacting a hydrolyzable group derived from the coupling agent of the reaction product with respect to the surface of the core particle 71. Hereinafter, each step will be described in detail.

[1] First, a siloxane bond-containing material is reacted with a coupling agent. The reaction is a reaction in which a reactive functional group contained in the siloxane bond-containing material is reacted with a reactive functional group contained in the coupling agent. Thus, the siloxane bond-containing material is modified by the coupling agent, and a hydrolyzable group derived from the coupling agent is located on a terminal of one side of the obtained reaction product.

For example, the reaction of the siloxane bond-containing material with the coupling agent can be performed by adding a sufficient amount of the coupling agent containing a reactive functional group with respect to the siloxane bond-containing material containing a reactive functional group. Thus, it is possible to enhance a reaction probability between the siloxane bond-containing material and the coupling agent, and it is possible to particularly enhance the yield of the reaction product.

As the siloxane bond-containing material, a silicone oil, an organopolysiloxane, or modified products thereof can be exemplified, and among these, in particular, the silicone oil or the modified products are preferably used.

Among these, as the silicone oil, any one may be used as long as it contains reactive functional groups such as an amino group, an epoxy group, a carboxyl group, a hydroxyl group, a mercapto group, an isocyanate group, a carbinol group, and acid chloride. Specifically, an amino-modified silicone oil, an epoxy-modified silicone oil, a carboxyl-modified silicone oil, and a carbinol-modified silicone oil can be exemplified.

In addition, the silicone oil may contain two or more kinds of the reactive functional groups described above.

On the other hand, as the coupling agent, any one may be used as long as it contains reactive functional groups such as an amino group, an epoxy group, a sulfide group, a vinyl group, an acryloxy group, a methacryloxy group, and a mercapto group. Specifically, a silane coupling agent and a titanium coupling agent can be exemplified.

In addition, the coupling agent may contain two or more kinds of the reactive functional groups described above.

In addition, the added amount of the coupling agent is preferably set to an amount containing a reactive functional group of one or more equivalents, and more preferably set to an amount containing a reactive functional group of equal to or greater than 1.5 equivalents with respect to a reactive functional group in the siloxane bond-containing material.

Moreover, FIGS. 9A and 9B are examples of a reaction scheme showing a reaction pathway for the reaction of the silicone oil with the silane coupling agent.

The reaction shown in FIG. 9A is a reaction of hydrosilylation of adding Si—H bonds to an organic double bond such as C=C. As a catalyst, for example, metal complexes of Groups 8 to 10 of the Periodic Table can be used, and platinum and the compounds thereof are particularly preferably used.

In addition, if necessary, as shown in FIG. 9B, after reacting a graft chain with the silicone oil, the coupling agent is further reacted with the obtained reaction product, whereby a reaction product may be obtained finally. At this time, as a graft chain, for example, other than 4-pentenoyl chloride shown in FIG. 9B, 10-undecenoyl chloride, 10-undecenoic acid, and 4-pentenoic acid can be used. By using such a method, it is possible to more finely adjust the molecular weight of the siloxane-based compound 72.

For example, the reaction can be performed at temperature of equal to or higher than 40° C. and equal to or lower than 80° C., and for equal to or longer than 5 minutes and equal to or shorter than 2 hours.

[2] Next, the core particle 71 is added in a solution containing the reaction product. Thus, a hydrolyzable group derived from the coupling agent in the reaction product and a functional group on the surface of the core particle 71 are reacted. As a result, it is possible to introduce the siloxane-based compound on the surface of the core particle 71. In this manner, electrophoretic particles 70 are obtained.

In the above manner, in the embodiment, a process in which after obtaining the reaction product by reacting the siloxane bond-containing material with the coupling agent in advance, the reaction product is reacted with the surface of the core particle 71 is performed. According to this method, as described above, since it is possible to sufficiently ensure an opportunity for the siloxane bond-containing material and the coupling agent to react when the reaction product is formed, it is possible to enhance the reaction probability. As a result, it is possible to enhance the yield of the reaction product.

In contrast, in the method in the related art, a process in which after modifying by introducing a coupling agent into core particles, a siloxane bond-containing material is added thereto, and by this, the siloxane bond-containing material and the coupling agent are reacted is performed. In this method, it is difficult to control a reaction frequency of a reactive functional group of the coupling agent introduced into the core particle and a reactive functional group of the siloxane bond-containing material, and therefore, there is a problem in that it is impossible to strictly adjust the introduction amount of the siloxane-based compound 72. In particular, since the siloxane bond-containing material has a linear molecular structure with a long chain, there is a tendency that the probability that the reactive functional group reacts with other functional group is decreased, and in order to compensate for this decrease of probability, it is necessary to previously introduce the coupling agent as much as possible with respect to the core particles. As a result, the charging characteristics derived from the core particles by a large amount of the coupling agent disappear, and therefore, there is a problem that it is impossible to achieve both the dispersibility and the charging characteristics.

On the other hand, in the embodiment, by reliably reacting the siloxane bond-containing material with the coupling agent in advance, the introduction amount of the obtained reaction product with respect to the core particle 71 can be easily controlled. It is considered that since the hydrolyzable group derived from the coupling agent is polyfunctional, the reaction probability with the surface of the core particle 71 is easily increased, and this is because the amount of the siloxane-based compound 72 to be introduced into the core particle 71 is strictly adjusted with ease by reacting the reaction product of the amount corresponding to the amount of the siloxane-based compound 72 to be introduced with the surface of the core particle 71.

Therefore, when the electrophoretic particles shown in FIG. 5B are manufactured, particularly, by using the manufacturing method described above, it is possible to obtain the electrophoretic particles in which each occupancy rate of the first region 711 and the second region 712 on the surface of the core particle 71 is strictly adjusted.

Moreover, the added amount of the core particle 71 with respect to the reaction product may be calculated such that the siloxane-based compound is bonded to a part of the surface of the core particle 71 on the basis of the area occupied by the siloxane-based compound which is estimated from the structure of the siloxane-based compound, and the surface area of the core particle 71.

Electronic Apparatus

Each display device 20 as described above can be incorporated into various electronic devices. Examples of the specific electronic device include electronic paper, an E-book, a TV, a viewfinder type video tape recorder and a direct monitor viewing type video tape recorder, a car navigation system, a pager, an electronic organizer, a calculator, electronic newspaper, a word processor, a personal computer, a workstation, a TV phone, a POS terminal, and devices with a touch panel.

Among these electronic devices, the electronic paper will be described in more detail.

Figure 10:
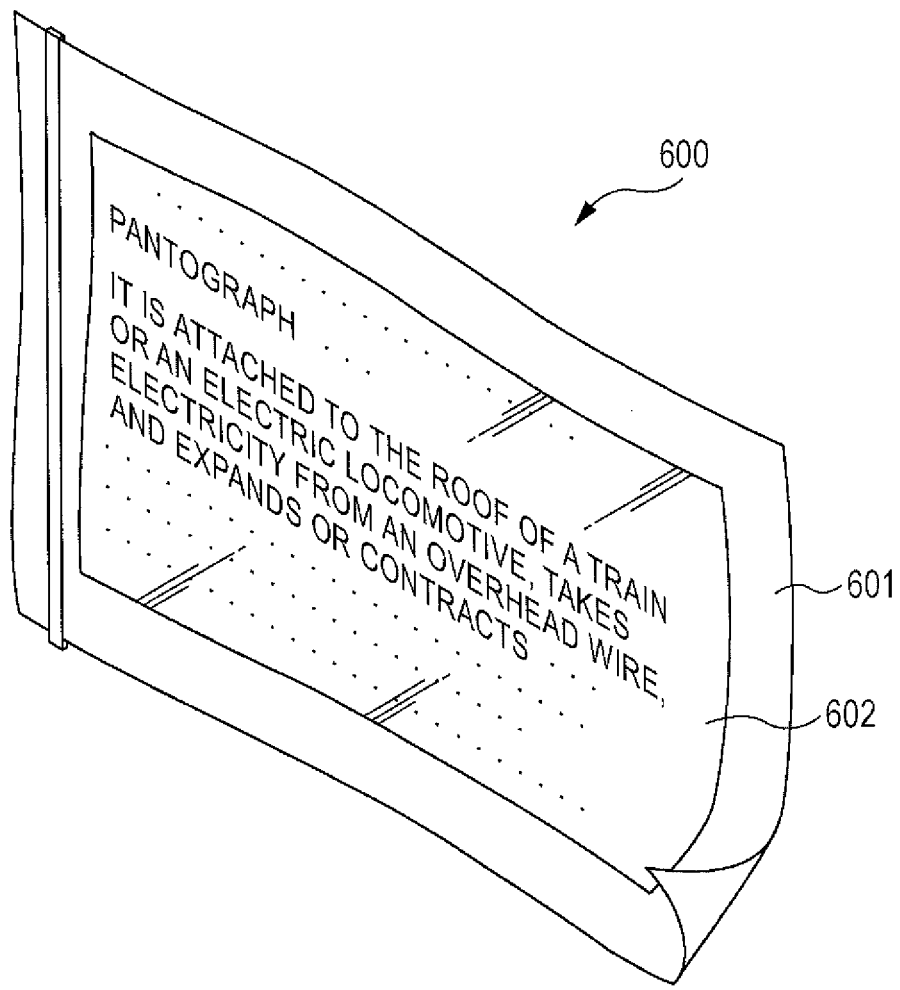
FIG. 10 is a perspective view showing one embodiment when an electronic apparatus according to the invention is applied to an electronic paper.

FIG. 10 is a perspective view showing the embodiment when an electronic apparatus according to an aspect of the invention is applied to the electronic paper.

An electronic paper 600 shown in FIG. 10 is equipped with a main body 601 configured with a rewritable sheet having the same texture and flexibility as a paper sheet, and a display unit 602. In the electronic paper 600, the display unit 602 is configured with the display device 20 as described above.

Next, an embodiment when the electronic apparatus according to an aspect of the invention is applied to a display will be described.

Figure 11A:
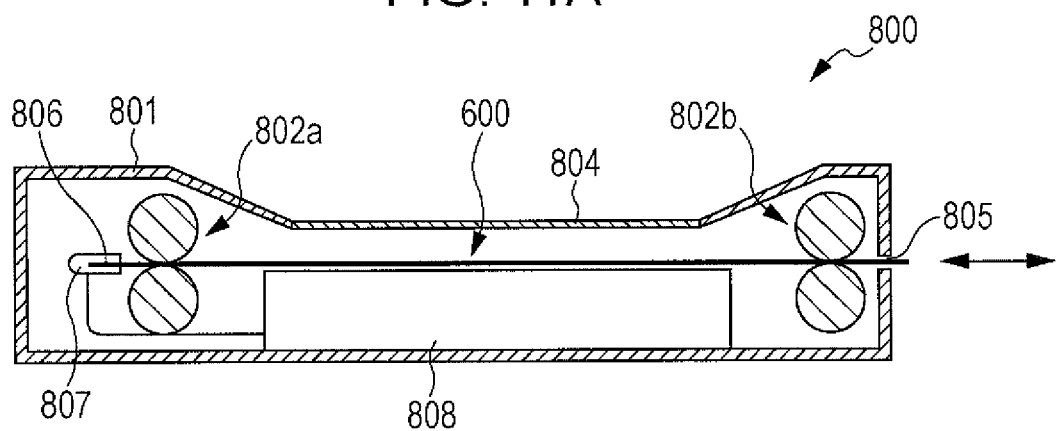
FIGS. 11A and 11B are diagrams showing one embodiment when an electronic apparatus according to the invention is applied to a display.
Figure 11B:
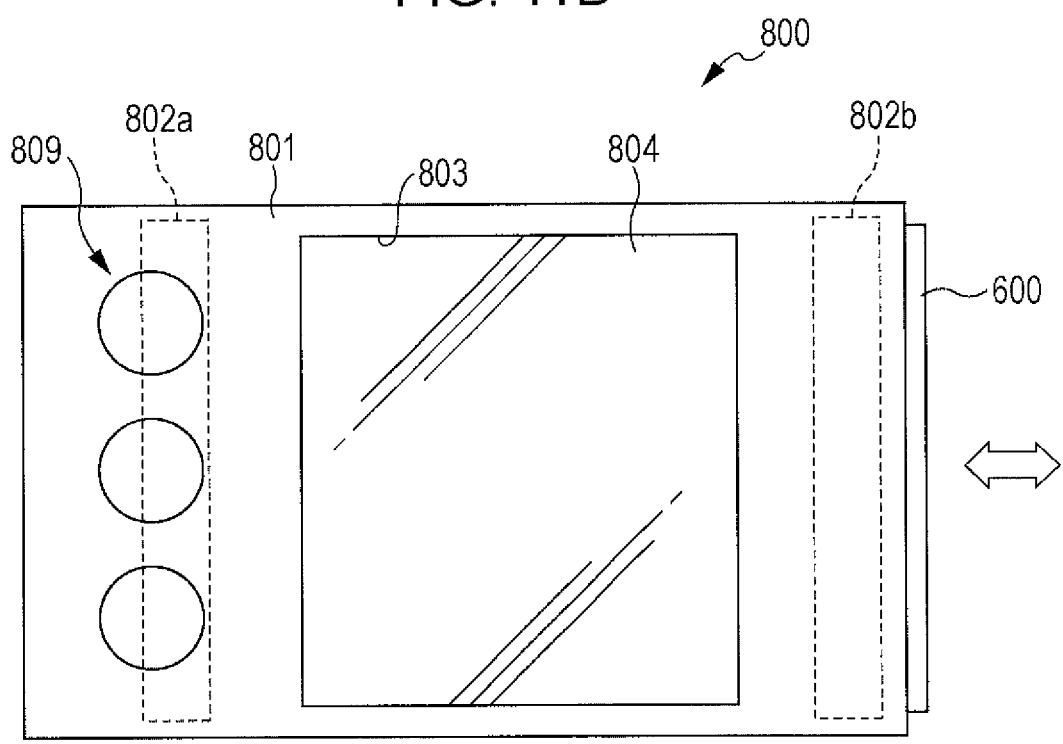

FIGS. 11A and 11B are diagrams showing one embodiment when an electronic apparatus according to an aspect of the invention is applied to a display. FIG. 11A is a cross-sectional view, and FIG. 11B is a plan view.

The display (display device) 800 shown in FIGS. 11A and 11B is equipped with a main body portion 801, and the electronic paper 600 which is attachably and detachably provided to the main body portion 801. Moreover, the electronic paper 600 is the same configuration as described above, that is, the configuration shown in FIG. 10.

In the main body portion 801, an insertion opening 805 to which the electronic paper 600 is inserted is formed at the side portion thereof (the right side in FIG. 11A), and two sets of a transportation roller pairs 802a and 802b are provided in the inside thereof. When the electronic paper 600 is inserted into the main body portion 801 through the insertion opening 805, the electronic paper 600 is provided in the main body portion 801 in a state where the electronic paper 600 is pinched by the transportation roller pair 802a and 802b.

In addition, in the display surface side (near side of a paper surface in FIG. 11B) of the main body portion 801, a rectangular hole portion 803 is formed, and in the hole portion 803, a transparent glass plate 804 is fitted in. Thus, it is possible to view the electronic paper 600 in a state provided in the main body portion 801 from the outside of the main body portion 801. That is, in the display 800, the display surface is configured such that the electronic paper 600 in a state provided in the main body portion 801 is viewed through the transparent glass plate 804.

In addition, in a front end portion (left side in FIG. 11A) in insertion direction of the electronic paper 600, a terminal portion 806 is provided, and in the inside of the main body portion 801, a socket 807 with which the terminal portion 806 in a state where the electronic paper 600 is provided in the main body portion 801 is connected is provided. In the socket 807, a controller 808 and an operating portion 809 are electrically connected.

In the display 800, the electronic paper 600 is attachably and detachably provided to the main body portion 801, and the electronic paper 600 can also be used in carrying in a state of being removed from the main body portion 801. Accordingly, convenience is further improved.

While the electrophoretic particles, the method for manufacturing the electrophoretic particles, the electrophoresis dispersion, the display device, and the electronic apparatus according to an aspect of the invention have been described on the basis of the embodiments illustrated, the invention is not limited thereto, and the configuration of each part can be substituted with an arbitrary configuration having the same function. In addition, other arbitrary component parts may also be added to the invention. In addition, each embodiment may be suitably combined.

EXAMPLES

Next, specific examples according to an aspect of the invention will be described.

1. Manufacturing of Electrophoretic Particles

Electrophoretic particles are manufactured in the following manner. Moreover, manufacturing conditions in each example and each comparative example are shown in Table 1, respectively.

Example 1

[1] First, a silicone oil represented by the following Formula (3), a silane coupling agent including a reactive functional group (—(Si)—H) of one or more equivalents with respect to a reactive functional group (—C═C) derived from the silicone oil included therein, and toluene were mixed in a round-bottom flask, and a platinum catalyst was added thereto. The mixture was stirred, and left in a state of being heated. Next, the mixture was cooled to room temperature, the solvent was removed under reduced pressure, and a remaining matter was dried. In the above manner, a reaction product of the silicone oil and the silane coupling agent, shown in the following Formula (4) was obtained.

Here, a weight average molecular weight of the obtained reaction product was measured, and it was 5,000.

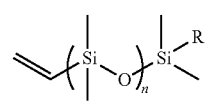

(3)

[In Formula (3), n is 50 to 100, and R is an alkyl group (butyl group).]

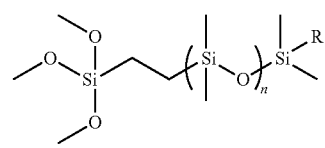

(4)

[In Formula (4), n is 50 to 100, and R is an alkyl group (butyl group).]

[2] Next, 0.01 g of the obtained reaction product and 2.0 g of titanium oxide particles (Ishihara Sangyo Kaisha Ltd., "CR-97") having an average particle diameter of 250 nm were mixed with toluene, and the mixture was heated to reflux. After that, the toluene was distilled off, thereby obtaining electrophoretic particles.

Example 2

[1] First, a silicone oil represented by the following Formula (6), a silane coupling agent including a reactive functional group (—NH$_2$) of one or more equivalents with respect to a reactive functional group (—COOH) derived from the silicone oil included therein, and toluene were mixed in a round-bottom flask, and the platinum catalyst was added thereto. The mixture was stirred, and left in a state of being heated. Next, the mixture was cooled to room temperature, the solvent was removed under reduced pressure, and remaining matter was dried. In the above manner, a reaction product of the silicone oil and the silane coupling agent, shown in the following Formula (7) was obtained.

Here, a weight average molecular weight of the obtained reaction product was measured, and it was 6,000.

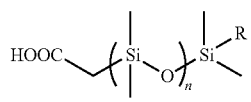
(6)

[In Formula (6), n is 50 to 100, and R is an alkyl group (butyl group).]

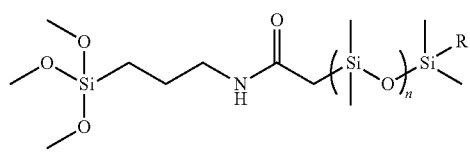
(7)

[In Formula (7), n is 50 to 100, and R is an alkyl group (butyl group).]

[2] Next, 0.03 g of the obtained reaction product and 2.0 g of the titanium oxide particles (Ishihara Sangyo Kaisha Ltd., "CR-97") having an average particle diameter of 250 nm were mixed with toluene, and the mixture was heated to reflux. After that, the toluene was distilled off, thereby obtaining electrophoretic particles.

Example 3

[1] First, a silicone oil represented by the following Formula (1), triethylamine, and dichloromethane were mixed in a round-bottom flask, and the mixture was stirred.

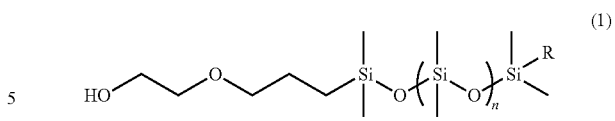
(1)

[In Formula (1), n is 50 to 100, and R is an alkyl group (butyl group).]

[2] Next, 4-pentenoyl chloride (graft chain) was added dropwise to the obtained mixture.

[3] After the dichloromethane was distilled off, hexane was added thereto. Then, the precipitated solid was filtered off, and the solvent was removed by volatilization from the liquid, thereby obtaining a reaction product of the silicone oil, 4-pentenoyl chloride, and the like.

[4] Next, the obtained reaction product, a silane coupling agent including a reactive functional group of one or more equivalents with respect to a reactive functional group derived from the silicone oil included therein, and toluene were mixed in a round-bottom flask, and the platinum catalyst was added thereto. The mixture was stirred, and left in a state of being heated. Next, the mixture was cooled to room temperature, the solvent was removed under reduced pressure, and remaining matter was dried. In the above manner, a reaction product of the compound in which the graft chain was introduced to the silicone oil and the silane coupling agent, shown in the following Formula (2) was obtained.

Here, a weight average molecular weight of the obtained reaction product was measured, and it was 3,500.

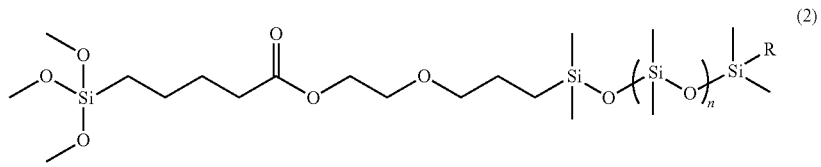
(2)

[In Formula (2), n is 50 to 100, and R is an alkyl group (butyl group).]

[5] Next, 0.05 g of the obtained reaction product and 2.0 g of the titanium oxide particles (Ishihara Sangyo Kaisha Ltd., "CR-97") having an average particle diameter of 250 nm were mixed with toluene, and the mixture was heated to reflux. After that, the toluene was distilled off, thereby obtaining electrophoretic particles.

Example 4

First, 0.08 g of a silicone oil represented by the following Formula (5) and 2.0 g of the titanium oxide particles (Ishihara Sangyo Kaisha Ltd., "CR-97") having an average particle diameter of 250 nm were mixed with toluene in a round-bottom flask, and the mixture was heated to reflux. After that, the toluene was distilled off, thereby obtaining electrophoretic particles.

Moreover, a weight average molecular weight of the silicone oil used was measured, and it was 3,000.

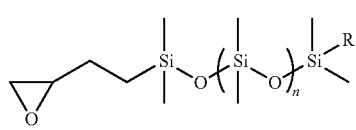
(5)

[In Formula (5), n is 50 to 100, and R is an alkyl group (butyl group).]

Examples 5 to 8

Electrophoretic particles were obtained in the same manner as in Example 1, respectively, except that the occupancy rate A1 of the first region in which the siloxane-based compound was bonded on surfaces of the core particles was adjusted to become the values shown in Table 1. Moreover, each weight average molecular weight of the siloxane-based compound used in each example is shown in Table 1.

Comparative Example 1

First, 0.3 g of an epoxy-modified silane coupling agent (γ-glycidoxypropyltrimethoxysilane), and 3.0 g of the titanium oxide particles (Ishihara Sangyo Kaisha Ltd., "CR-97") having an average particle diameter of 250 nm were mixed with toluene in a round-bottom flask, and the mixture was reacted while a dispersing treatment was performed by heating. After the reaction was completed, the content of the flask was cooled, and then, toluene was distilled off thereby obtaining electrophoretic particles.

Comparative Example 2

Electrophoretic particles were obtained in the same manner as in Comparative Example 1 except that a mercapto-modified silane coupling agent was used as the silane coupling agent.

Comparative Example 3

[5] Titanium oxide particles (Ishihara Sangyo Kaisha Ltd., "CR-97") having an average particle diameter of 250 nm were used as the electrophoretic particles without change.

Comparative Example 4

Electrophoretic particles was obtained in the same manner as in Example 3 except that a coating film of a silicone oil was formed by coating an excessive amount of a silicone oil represented by the above-described Formula (5) on a surface of the titanium oxide particle.

2. Evaluation of Electrophoretic Particles

First, the electrophoretic particles obtained in each examples and each comparative examples were dispersed in a dimethyl silicone oil in which an anthraquinone blue (dye) was dissolved, such that the proportion of the electrophoretic particles is 10% by mass thereby manufacturing an electrophoresis dispersion. Moreover, a dielectric constant of dimethyl silicone oil used was approximately 2.72.

Next, an electrophoresis display device as shown in FIG. 1 was manufactured using the electrophoresis dispersion. Each specification is as follows.

Base portion 1 and base portion 2
Size: length 50 mm×width 50 mm×thickness 100 μm
Constituent material: polyethylene
First electrode 3 and second electrode 4 (moreover, the second electrode is not divided)
Size: length 40 mm×width 40 mm×thickness 4 μm
Constituent material: ITO
Spacer
Size: width 5 mm×height 50 μm
Constituent material: epoxy resin Moreover, a dispersant was further added in the electrophoresis dispersion formed using the electrophoretic particles obtained in Comparative Example 2. The concentration of the dispersant was 0.4% by mass with respect to the silicone oil.

Moreover, as the dispersant, a polymeric dispersant (Solsperse 18000, manufactured by Lubrizol Corp.) was used.

2.1 Evaluation of Dispersibility (Reflectance)

A predetermined voltage (15 V, 400 ms) was applied to each electrophoresis display device obtained to collect the electrophoretic particles on each of the first electrode side.

As a result, a white color was displayed on the display surface. The white display is derived from the titanium oxide. Since the electrophoretic particles are aggregated with each other as little as possible, and the electrophoretic particles are dispersed as evenly as possible, the excellent white color with a high reflectance is displayed.

Therefore, by measuring the reflectance of the white display, the dispersibility of the electrophoretic particles was comparatively evaluated. Moreover, the evaluation was performed according to the following evaluation criteria.

Evaluation Criteria of Dispersibility
B: Dispersibility is favorable (reflectance is high)
C: Dispersibility is slightly favorable (reflectance is slightly high)
D: Dispersibility is poor (reflectance is low)

In addition, after reflection density D was measured using a Macbeth spectrophotometer (SpectroEye, manufactured by GretagMacbeth), the reflectance was calculated by the formula "reflectance=$100/10^D$".

2.2 Evaluation of Charging Characteristics (Mobility)

A predetermined voltage was applied to each electrophoresis display device obtained to collect the electrophoretic particles on each of the first electrode side.

As a result, a white color was displayed on the display surface.

Next, a predetermined voltage was applied to collect the electrophoretic particles on the second electrode side. Thus, the electrophoretic particles collected on the first electrode side migrate to the second electrode side. Therefore, by measuring the time required to migrate a predetermined distance, it is possible to measure the mobility of the electrophoretic particles. Therefore, by measuring the mobility, the charging characteristics of the electrophoretic particles was comparatively evaluated. Moreover, the evaluation was performed according to the following evaluation criteria.

Evaluation Criteria of Charging Characteristics
B: Charge amount is large (mobility is large)
C: Charge amount is slightly large (mobility is slightly large)
D: Charge amount is small (mobility is small)

2.3 Evaluation of Resistivity

A voltage was applied between to the first electrode and the second electrode of each electrophoresis display device obtained, and a volume resistivity between electrodes was measured.

2.4 Evaluation of Display Unevenness

Display unevenness of each electrophoresis display device obtained was evaluated. The evaluation was performed according to the following evaluation criteria. Moreover, the "display unevenness" mentioned herein corresponds to a time lag until a white display is completed after transition is started at the time of transition from a non-white display state to a white display state.

Evaluation Criteria of Display Unevenness
A: Display unevenness is very low (time lag is very small)
B: Display unevenness is low (time lag is small)
C: Display unevenness is high (time lag is large)
D: Display unevenness is very high (time lag is very large)

Evaluation results are shown in Table 1.

TABLE 1

|  |  |  | Example 1 | Example 2 | Example 3 | Example 4 | Example 5 | Example 6 |
|---|---|---|---|---|---|---|---|---|
| Electrophoretic particles | Core particle | — | $TiO_2$ | $TiO_2$ | $TiO_2$ | $TiO_2$ | $TiO_2$ | $TiO_2$ |
|  | A1 | % | 0.1 | 0.6 | 0.9 | 0.7 | 0.03 | 2.5 |
|  | A1/A2 | — | 0.0005 | 0.006 | 0.009 | 0.007 | 0.0003 | 0.026 |
|  | Siloxane bond-containing material | — | Formula (3) | Formula (6) | Formula (1) | Formula (5) | Formula (3) | Formula (3) |
|  | Graft chain | — | — | — | — | 4-Pentenoyl chloride | — | — |
|  | Siloxane-based compound | — | Formula (4) | Formula (7) | Formula (2) | Formula (5) | Formula (4) | Formula (4) |
|  | Molecular weight of siloxane-based compound | — | 5000 | 6000 | 3500 | 3000 | 2500 | 9000 |
|  | Amount of siloxane-based compound with respect to 100 parts by mass of core particle | Parts by mass | 0.5 | 1.5 | 2.5 | 4.0 | 0.2 | 3.6 |
| Dispersion | Dispersion medium | — | Dimethyl silicone oil | | | | | |
|  | Dispersant | % by mass | — | — | — | — | — | — |
| Evaluation result | Dispersibility (reflectance) | — | B | B | B | B | C | B |
|  | Charging characteristics (mobility) | — | B | B | B | B | B | B |
|  | Volume resistivity | $\Omega \cdot m$ | Equal to or greater than $1 \times 10^{15}$ | Equal to or greater than $1 \times 10^{15}$ | Equal to or greater than $1 \times 10^{15}$ | Equal to or greater than $1 \times 10^{15}$ | Equal to or greater than $1 \times 10^{15}$ | Equal to or greater than $1 \times 10^{15}$ |
|  | Presence or absence of display unevenness | — | A | A | A | B | B | A |

|  |  |  | Example 7 | Example 8 | Comparative Example 1 | Comparative Example 2 | Comparative Example 3 | Comparative Example 4 |
|---|---|---|---|---|---|---|---|---|
| Electrophoretic particles | Core particle | — | $TiO_2$ | $TiO_2$ | $TiO_2$ | $TiO_2$ | $TiO_2$ | $TiO_2$ |
|  | A1 | % | 4.3 | 12.3 | (32.1) | (15.4) | 0 | Nearly entire surface |
|  | A1/A2 | — | 0.045 | 0.14 | — | — | — | — |
|  | Siloxane bond-containing material | — | Formula (3) | Formula (3) | — | — | — | Formula (5) |
|  | Graft chain | — | — | — | — | — | — | — |
|  | Siloxane-based compound | — | Formula (4) | Formula (4) | Epoxy-modified silane coupling agent | Mercapto-modified silane coupling agent | — | — |
|  | Molecular weight of siloxane-based compound | — | 12000 | 15000 | — | — | — | 8000 |
|  | Amount of siloxane-based compound with respect to 100 parts by mass of core particle | Parts by mass | 4.8 | 7.2 | — | — | 0 | 50 |
| Dispersion | Dispersion medium | — | Dimethyl silicone oil | | | | | |
|  | Dispersant | % by mass | — | — | — | — | 0.4 | — |
| Evaluation result | Dispersibility (reflectance) | — | B | B | C | C | D | B |
|  | Charging characteristics (mobility) | — | B | C | D | D | B | D |
|  | Volume resistivity | $\Omega \cdot m$ | Equal to or greater than $1 \times 10^{15}$ | Equal to or greater than $1 \times 10^{15}$ | Equal to or greater than $1 \times 10^{15}$ | Equal to or greater than $1 \times 10^{15}$ | $5 \times 10^{11}$ | Equal to or greater than $1 \times 10^{15}$ |
|  | Presence or absence of display unevenness | — | A | B | D | D | B | C |

\* The number in parenthesis of A1 refers to the occupancy rate in the region to which a coupling agent is bonded.

As clearly seen from Table 1, in the electrophoresis display device manufactured using the electrophoretic particles obtained in each example, both the dispersibility and the charging characteristics were achieved. In addition, since both the dispersibility and the charging characteristics can be realized even when a dispersant is not used, it was possible suppress a decrease in the insulating property between the electrodes, and it was possible to achieve reduction in the power consumption of the electrophoresis display device. In addition, the display unevenness of the electrophoresis display device was also slightly suppressed.

On the other hand, in the electrophoresis display device manufactured using the electrophoretic particles obtained in Comparative Example 4, the charge amount was substantially zero. Accordingly, it is assumed that, in the electrophoretic particles obtained in Comparative Example 4, the surface of the core particle is covered with the coupling agent over the whole surface, and thus, the charging characteristics derived from the core particle are buried.

In addition, in the electrophoresis display device manufactured using the electrophoretic particles obtained in Comparative Example 3, the result in which the dispersibility of the electrophoretic particles was slightly low was obtained. In addition, the result in which the volume resistivity between the electrodes is smaller by four digits or more in comparison with the electrophoresis display device manufactured using the electrophoretic particles obtained in each examples, and a comparatively large leakage current was generated was obtained. It is considered that this is because the dispersant added in the electrophoresis dispersion affects.

In addition, in the electrophoretic particles obtained in Comparative Examples 1 and 2, the result in which the charge amount is small, and the display unevenness was high was obtained.

Moreover, electrophoretic particles are manufactured in the same manner as in each examples and each comparative examples described above except that the composite particles in which the surfaces of silica particles are coated with an acryl-based resin are used as the core particle instead of the titanium oxide particles, and evaluated. As a result, the obtained evaluation results showed substantially the same tendency as in the case where the titanium oxide particles are used as the core particles. That is, in the electrophoretic particles obtained in each example, the result in which both the dispersibility and the charging characteristics are achieved even when a dispersant is not used, and the display unevenness is low was obtained.

On the basis of what has been described above, it was made clear that according to an aspect of the invention, the electrophoretic particles having both the dispersibility and the charging characteristics can be obtained, and the electrophoresis dispersion having an excellent insulating property can be obtained.

This application is based on and claims priority from Japanese Patent Application No. 2013-118129, filed on Jun. 4, 2013 and 2014-028732, filed on Feb. 18, 2014, the contents of which are incorporated herein by reference.

What is claimed is:

1. An Electrophoretic particle, comprising:
   a particle; and
   a siloxane-based compound which is bonded to surface of the particle, and includes a connecting structure in which a plurality of siloxane bonds are connected in series,
   wherein the surface of the particle includes a first region to which the siloxane-based compound is bonded, and a second region in which the surface is exposed.

2. The electrophoretic particle according to claim 1, wherein a content of the siloxane-based compound is equal to or greater than 0.1 parts by mass and equal to or less than 5 parts by mass with respect to 100 parts by mass of the particle.

3. The electrophoretic particle according to claim 1, wherein an occupancy rate of the first region on the surface of the particle is equal to or greater than 0.05% and equal to or less than 20%.

4. The electrophoretic particle according to claim 3, wherein when the occupancy rate of the first region on the surface of the particle is A1, and an occupancy rate of the second region on the surface of the particle is A2, A1/A2 is equal to or greater than 0.0005 and equal to or less than 0.1.

5. The electrophoretic particle according to claim 1, wherein the siloxane-based compound has a linear molecular structure configured with a main chain including the connecting structure and a side chain bonded to the main chain.

6. The electrophoretic particle according to claim 1, wherein the siloxane-based compound is a compound obtained by a method in which a silicone oil and a coupling agent are reacted, and a hydrolyzable group derived from the coupling agent of the obtained reaction product and the surface of the particle are subjected to a dehydration condensation reaction.

7. The electrophoretic particle according to claim 1, wherein the siloxane-based compound is a compound obtained by a reaction of a functional group derived from the silicone oil and the surface of the particle.

8. The electrophoretic particle according to claim 6, wherein the siloxane-based compound has a functional group capable of bonding to the surface of the particle at a terminal of one side of the connecting structure in a state before the siloxane-based compound is reacted with the surface of the particle.

9. The electrophoretic particle according to claim 1, wherein a weight average molecular weight of the siloxane-based compound is equal to or greater than 1,000 and equal to or less than 100,000.

10. The electrophoretic particle according to claim 1, wherein a constituent material of the surface of the particle includes an inorganic material, and the charging characteristic is based on a hydroxyl group present on the surface.

11. The electrophoretic particle according to claim 1, wherein the constituent material of the surface of the particle includes an organic material having a dissociable group, and the charging characteristic is based on the dissociable group present on the surface.

12. A method for manufacturing electrophoretic particle, comprising:
   obtaining a reaction product by reacting a siloxane bond-containing material with a coupling agent; and
   bonding a siloxane-based compound derived from the reaction product to a part of surface of a particle by reacting a hydrolyzable group derived from the coupling agent of the reaction product with the surface.

13. An electrophoresis dispersion, comprising:
   electrophoretic particle which have particle and a siloxane-based compound, and is configured such that surface of the particle includes a first region to which a siloxane-based compound is bonded, and a second region in which charging characteristics derived from the particle is expressed by exposure of the surface; and a dispersion medium having a dielectric constant of equal to or greater than 1.5 and equal to or less than 3 which disperses the electrophoretic particle.

14. A display device, comprising:
an electrode substrate equipped with a substrate and an electrode;
the electrophoresis dispersion according to claim 13; and
a dispersion enclosing space provided at one surface side of the electrode substrate which encloses the electrophoresis dispersion.

15. An electronic apparatus comprising the display device according to claim 14.

* * * * *